(12) United States Patent
Uno et al.

(10) Patent No.: US 11,029,218 B2
(45) Date of Patent: Jun. 8, 2021

(54) DETERMINATION DEVICE, DETERMINATION METHOD, AND NON-TRANSITORY COMPUTER-READABLE RECORDING MEDIUM

(71) Applicant: FUJITSU LIMITED, Kawasaki (JP)

(72) Inventors: Kazushi Uno, Atsugi (JP); Takahiro Arioka, Isehara (JP); Takeo Kasajima, Machida (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 493 days.

(21) Appl. No.: 15/676,496

(22) Filed: Aug. 14, 2017

(65) Prior Publication Data

US 2018/0031428 A1 Feb. 1, 2018

Related U.S. Application Data

(63) Continuation of application No. PCT/JP2016/054311, filed on Feb. 15, 2016.

(30) Foreign Application Priority Data

Feb. 17, 2015 (JP) .............................. JP2015-029057

(51) Int. Cl.
*G05B 23/02* (2006.01)
*G01K 11/32* (2021.01)
(Continued)

(52) U.S. Cl.
CPC .............. *G01K 11/32* (2013.01); *G01K 3/005* (2013.01); *G01M 3/002* (2013.01);
(Continued)

(58) Field of Classification Search
CPC ............ G05B 23/0254; G05B 23/0235; G05B 23/024; G05B 23/0243
See application file for complete search history.

(56) References Cited

U.S. PATENT DOCUMENTS 4,509,110 A 4/1985 Levesque, Jr. et al.
4,823,166 A 4/1989 Hartog et al.
(Continued)

FOREIGN PATENT DOCUMENTS

EP 2 518 450 A1 10/2012
GB 2 374 147 A 10/2002
(Continued)

OTHER PUBLICATIONS

Canadian Office Action dated Apr. 2, 2019 in Canadian Patent Application No. 2,976,620.
(Continued)

*Primary Examiner* — Mohamed Charioui
*Assistant Examiner* — Christine Y Liao
(74) *Attorney, Agent, or Firm* — Staas & Halsey LLP

(57) ABSTRACT

A determination device includes: a memory; and a processor coupled to the memory and the processor configured to executes a process, the process comprising: generating a reference model of a sensor detection value; determining whether a time from a predetermined point in time until a deviation between the reference model and the sensor detection value exceeds a threshold is shorter than a predetermined time; and outputting a signal associated with an abnormality when the time is determined to be shorter.

22 Claims, 28 Drawing Sheets

(51) Int. Cl.
  *G01K 3/00* (2006.01)
  *G01M 3/00* (2006.01)
  *G05B 19/042* (2006.01)
  *G01K 11/324* (2021.01)

(52) U.S. Cl.
  CPC ........ *G05B 23/0243* (2013.01); *G01K 11/324* (2021.01); *G05B 19/0425* (2013.01); *G05B 23/0235* (2013.01)

(56) References Cited

U.S. PATENT DOCUMENTS

| | | | |
|---|---|---|---|
| 6,535,517 B1* | 3/2003 | Arkko | H04M 7/122 370/401 |
| 8,577,649 B2 | 11/2013 | Suyama et al. | |
| 2003/0068834 A1 | 4/2003 | Kishkovich et al. | |
| 2003/0083756 A1* | 5/2003 | Hsiung | G05B 15/02 700/28 |
| 2007/0043539 A1 | 2/2007 | Niina et al. | |
| 2007/0090690 A1* | 4/2007 | Ohkubo | B60T 8/94 303/122 |
| 2008/0091368 A1 | 4/2008 | Lequeux et al. | |
| 2010/0198555 A1 | 8/2010 | Takahama et al. | |
| 2011/0276828 A1 | 11/2011 | Tamaki et al. | |
| 2011/0288660 A1 | 11/2011 | Wojsznis et al. | |
| 2013/0173218 A1* | 7/2013 | Maeda | G05B 23/0221 702/182 |
| 2013/0213600 A1 | 8/2013 | Saitoh | |
| 2014/0294040 A1 | 10/2014 | Zhang et al. | |
| 2016/0056064 A1* | 2/2016 | Miki | H01L 21/67288 702/182 |

FOREIGN PATENT DOCUMENTS

| | | |
|---|---|---|
| JP | 59-2111 | 1/1984 |
| JP | 62-110160 | 5/1987 |
| JP | 2-123304 | 5/1990 |
| JP | 4-50723 | 2/1992 |
| JP | 7-12655 | 1/1995 |
| JP | 10-9974 | 1/1998 |
| JP | 2000-89801 | 3/2000 |
| JP | 2002-267242 | 9/2002 |
| JP | 2003-14554 | 1/2003 |
| JP | 2003-57126 | 2/2003 |
| JP | 2005-504280 | 2/2005 |
| JP | 2006-323538 | 11/2006 |
| JP | 2008-512800 | 4/2008 |
| JP | 2008-512801 | 4/2008 |
| JP | 2008-275561 | 11/2008 |
| JP | 2009-265077 | 11/2009 |
| JP | 2010-191641 | 9/2010 |
| JP | 2011-248885 | 12/2011 |
| JP | 2012-67757 | 4/2012 |
| JP | 2012-141241 | 7/2012 |
| JP | 2012-247855 | 12/2012 |
| JP | 2013-242637 | 12/2013 |
| JP | 2014-115714 | 6/2014 |
| WO | 03/026774 A1 | 4/2003 |
| WO | 2005/038545 A1 | 4/2005 |
| WO | 2006/031749 A2 | 3/2006 |
| WO | 2006/031750 A2 | 3/2006 |
| WO | 2010/082322 | 7/2010 |

OTHER PUBLICATIONS

Fujitsu Laboratories Ltd., "Fujitsu Develops Technology Enabling Real-time Multiple-Point Temperature Measurement—Helps reduce energy consumption in large data centers by creating greater visibility of temperature distribution—"Fujitsu Laboratories Ltd. Press Release, Apr. 4, 2008.
Fujitsu Facility Solution, "Optical fiber temperature measurement system", Apr. 25, 2012, http://jp.fujitsu.com/group/fnets/services/eco/opticalfiber.html.
Wada, K., "Detection of multivariate outliers: Modified Stahel-Donoho estimators." *Research memoir of official statistics*, No. 67, pp. 89-157. Mar. 2010
International Search Report dated Apr. 12, 2016 in corresponding International Application No. JP/2016/054311.
Written Opinion dated of International Search Report dated Apr. 12, 2016 in corresponding International Patent Application No. JP/2016/054311.
Japanese Office Action dated Jul. 23, 2019 in Japanese Patent Application No. 2018-107707.
Office Action dated May 8, 2018, in corresponding Australian Patent Application No. 2016220855, 6 pgs.
Australian Second Examination Report dated Aug. 31, 2018 in counterpart Australian Patent Application No. 2016220855.
Indian Office Action dated Dec. 18, 2019 in Indian Patent Application No. 201737028777.
Canadian Office Action dated Feb. 25, 2020 in Canadian Patent Application No. 2,976,620.
Canadian Office Action dated Dec. 8, 2020 in Canadian Patent Application No. 2,976,620.

\* cited by examiner

STARTING TIME OF RE-ESTIMATION

DETERMINATION DEVICE, DETERMINATION METHOD, AND NON-TRANSITORY COMPUTER-READABLE RECORDING MEDIUM

CROSS-REFERENCE TO RELATED APPLICATIONS

This application is a continuation application, under 35 U.S.C. § 111(a), of International Application PCT/JP2016/054311 filed on Feb. 15, 2016 and which claims the foreign priority benefit under 35 U.S.C. § 119 of Japanese Patent Application No. 2015-029057 filed on Feb. 17, 2015, the entire contents of which are incorporated herein by reference.

FIELD

A certain aspect of the embodiments is related to a determination device, a determination method, and a non-transitory computer-readable recording medium.

BACKGROUND

There is developed a technology for determining whether an abnormality occurs. For example, there are disclosed a technology in which it is determined whether the abnormality occurs on the basis of a deviation from a model (for example, see Patent Document 1) and a technology in which it is determined whether the abnormality occurs on the basis of an integration of a difference from a model (for example, see Patent Document 2).

PRIOR ART DOCUMENT

Patent Document

Patent Document 1: International Publication Pamphlet No. WO2010/082322
Patent Document 2: Japanese Laid-open Patent Publication No. H04-25565

SUMMARY

According to an aspect of the present invention, there is provided a determination device including: a memory; and a processor coupled to the memory and the processor configured to executes a process, the process comprising: generating a reference model of a sensor detection value; determining whether a time from a predetermined point in time until a deviation between the reference model and the sensor detection value exceeds a threshold is shorter than a predetermined time; and outputting a signal associated with an abnormality when the time is determined to be shorter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will be given of an outline of determination of abnormality.

A gas leak may occur in a chemical plant, an oil refinery, a thermal power station and so on, because of erosion. And so, it is preferable to determine early whether abnormality occurs. For example, it is thought that a temperature sensor is provided on a pipe system in which a branch pipe is welded with a main pipe, and a leak of gas or liquid is early detected as a temperature changing. Alternatively, it is possible to detect a temperature abnormality early before a fire even if abnormality of cooling occurs, by monitoring a temperature of a coolant water pipe. In the following description, "detection of precursory phenomenon" of abnormality means "detection of precursory phenomenon in a case where a part of an operation of a means for monitoring an object is visualized and it is determined that the visualized condition is different from a normal condition."

Figure 1A:
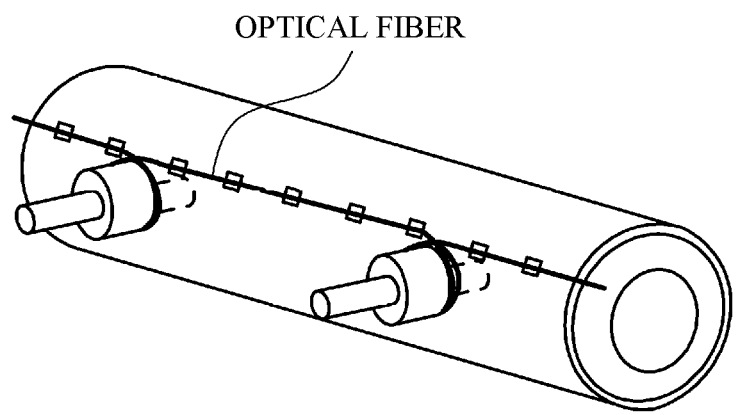
FIG. 1A and FIG. 1B illustrate an example of a temperature measurement method by an optical fiber.
Figure 1B:
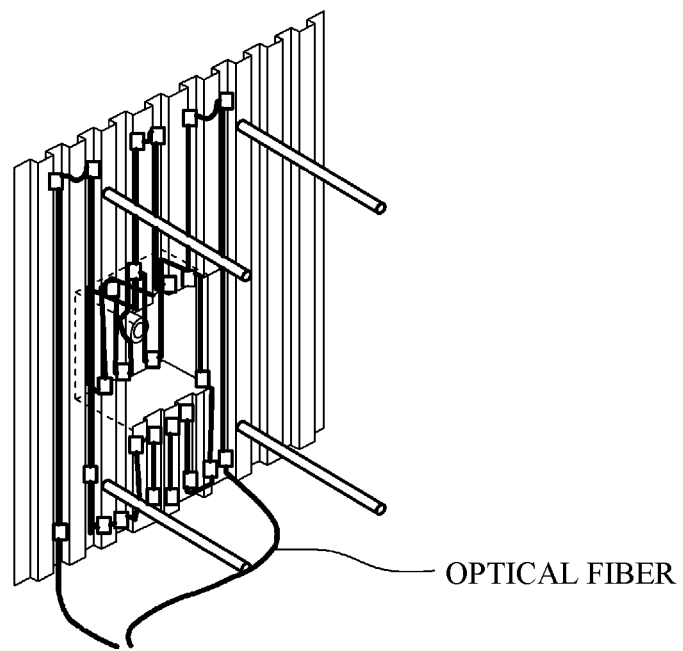

There is a temperature measurement method for obtaining temperature information by measuring a Raman scattering light with use of an optical fiber. For example, as illustrated in FIG. 1A, an optical fiber is provided on a branch pipe, and it is possible to detect a leak early by detecting a temperature changing. And, as illustrated in FIG. 1B, an optical fiber is provided on a coolant water pipe of a boiler, and it is possible to monitor a temperature of the coolant water. Therefore, even if abnormality of cooling occurs, it is possible to detect temperature abnormality early before occurring of fire.

However, in a plant engineering, it is not preferable that "abnormality is detected in order to prevent an accident minimally" but is preferable that "an accident is prevented before happens by predicting precursory phenomenon of abnormality". And so, parameters such as sensor data of various operation controls are used as explanatory variables. A regression analysis using appendix sensor information as a target variable is performed. And, a correlation analysis of appendix sensor information is performed, and a method of determining statically whether abnormality occurs is used. This is because a network technology is improved so that parameters such as sensor data for an operation control can be administrated at once, and various regression analysis methods or various correlation analysis methods are applied in real time due to increase of computer power.

However, the methods focus on minimization of "an estimated error" (a difference between an estimated value and a measured value). Therefore, there is no practicable discussion with respect to an extent of "the estimated error" for abnormality determination. For example, in a thermal power station, oil types, coal types and so on are not classified into patterns. Properties of the oil types, the coal types and so on change every time because of a producing country or mixing ratio. It is therefore necessary to perform an initialization for estimation each time the property changes. However, accuracy of the initialization influences on "the estimated error". Therefore, only a method whose setting is easy tends to be adopted. In the method, for example, it is determined whether abnormality occurs on the basis of a changing of "the estimated error" for a predetermined time. Thus, ambiguous thresholds are set, and the system tends to become non-practicable.

Figure 2:
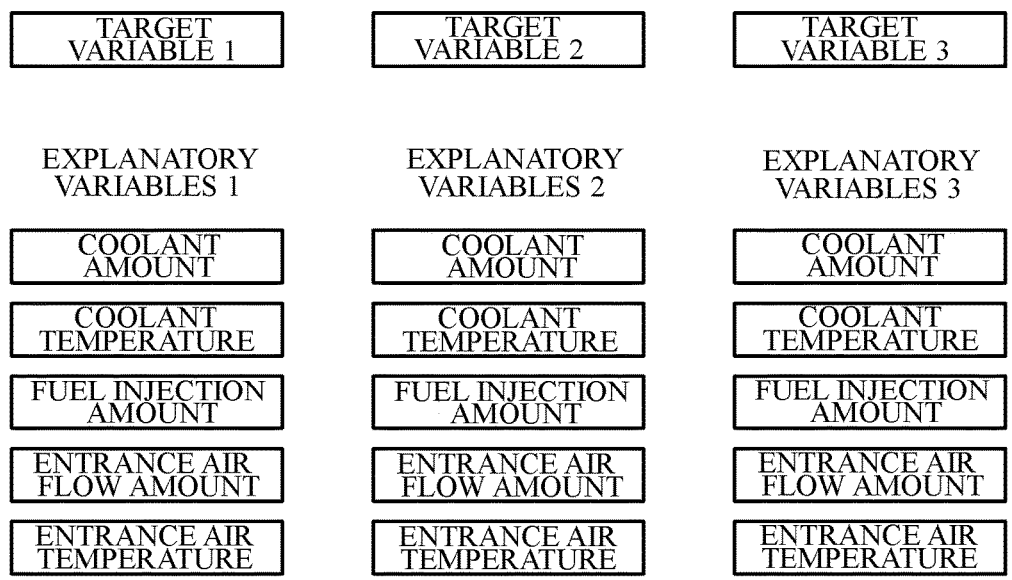
FIG. 2 illustrates an example of target variables and explanatory variables.

FIG. 2 illustrates an example of target variables and explanatory variables. In the example of FIG. 2, the target variables 1 to 3 are temperatures of positions of an outer wall metal of a boiler. The explanatory variables are output values of sensors having a correlation with the target variables. It is possible to acquire measured values of the target variables 1 to 3 with use of temperature sensors provided on the outer wall metal. As illustrated in FIG. 2, estimated formulas of the target variables 1 to 3 are obtained by setting coefficients and constants of each explanatory variable. These coefficients and constants are determined on the basis of measured values of past explanatory variables and past target variables, by Ordinary Least Mean Square, Principal Components Regression, Partial Least Squares or the like. When information of the explanatory variables is collected, the explanatory variables are input into the estimated formulas and estimated values are calculated.

It is possible to determine whether the system is normal or abnormal, by comparing measured values of the target variables and estimated values of the estimated formulas that are obtained at the same time. Immediate past data of a predetermined time are necessary for setting the coefficients and the constants of the estimated formulas. The immediate past period is referred to as "a modeling period". On the other hand, a period for actually comparing estimated values with measured values is referred to as "a scoring period". In the scoring period, when "the estimated error" exceeds a predetermined value, it is thought that a condition off the estimation occurs.

Figure 3A:
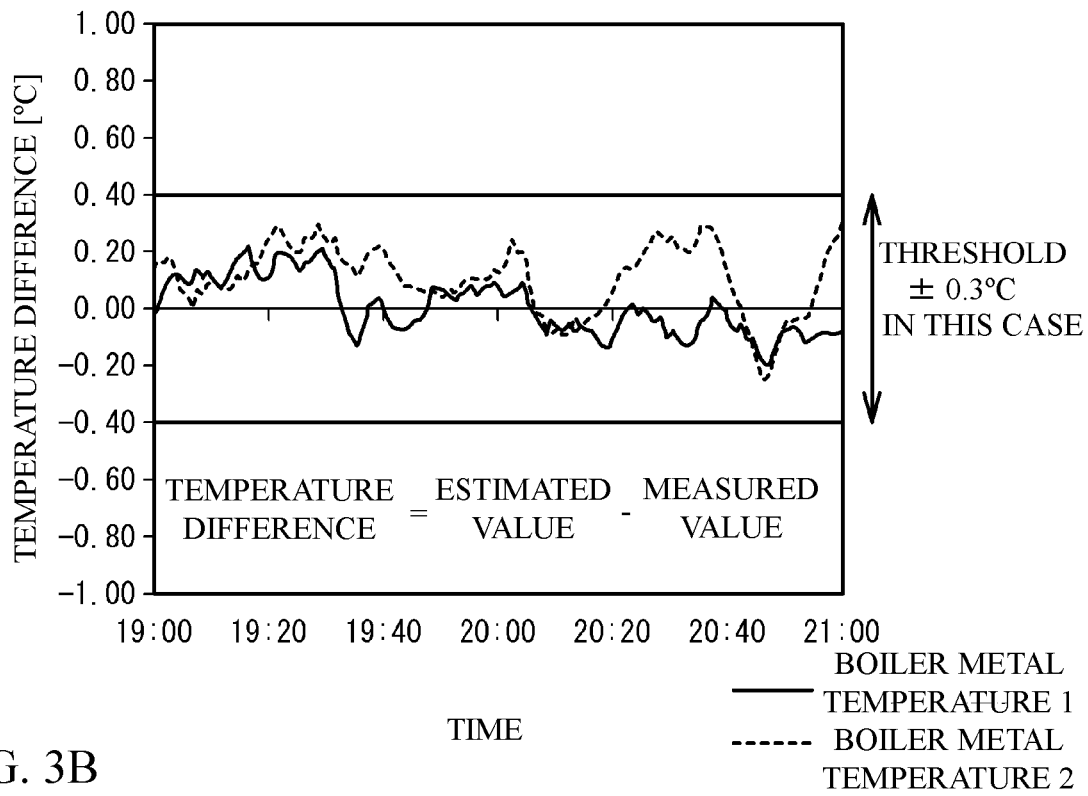
FIG. 3A illustrates an image in which a difference between estimated values and measured values is expressed by a temperature difference in a case where a fuel type A is used.
Figure 3B:
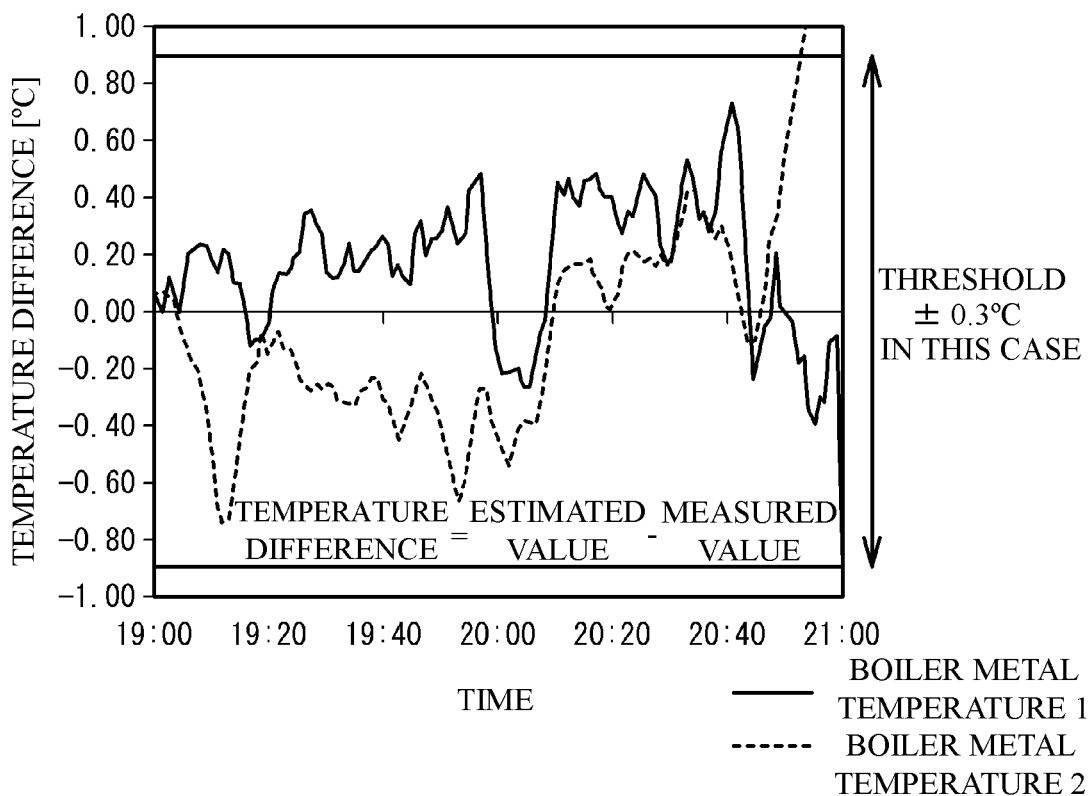
FIG. 3B illustrates an image in which a difference between estimated values and measured values is expressed by a temperature difference in a case where a fuel type B is used.

FIG. 3A illustrates an image in which differences between estimated values and measured values of the target variable 1 and the target variable 2 are expressed by temperature difference in the scoring period in the case where a fuel type A is used. FIG. 3B illustrates an image in which differences between estimated values and measured values of the target variable 1 and the target variable 2 are expressed by temperature difference in the scoring period in the case where a fuel type B is used.

In the case of the fuel type A, when a threshold is $3\sigma$, the threshold is plus minus 0.3 degrees C. In the case of the fuel type B, when a threshold is $3\sigma$, the threshold is plus minus 0.9 degrees C. However, it is difficult to objectively determine whether a condition exceeding the $3\sigma$ is abnormal, because the condition may exceed the $3\sigma$ with a probability of 0.3%. On the other hand, when the threshold is $4\sigma$, abnormality may be missed.

Figure 4:
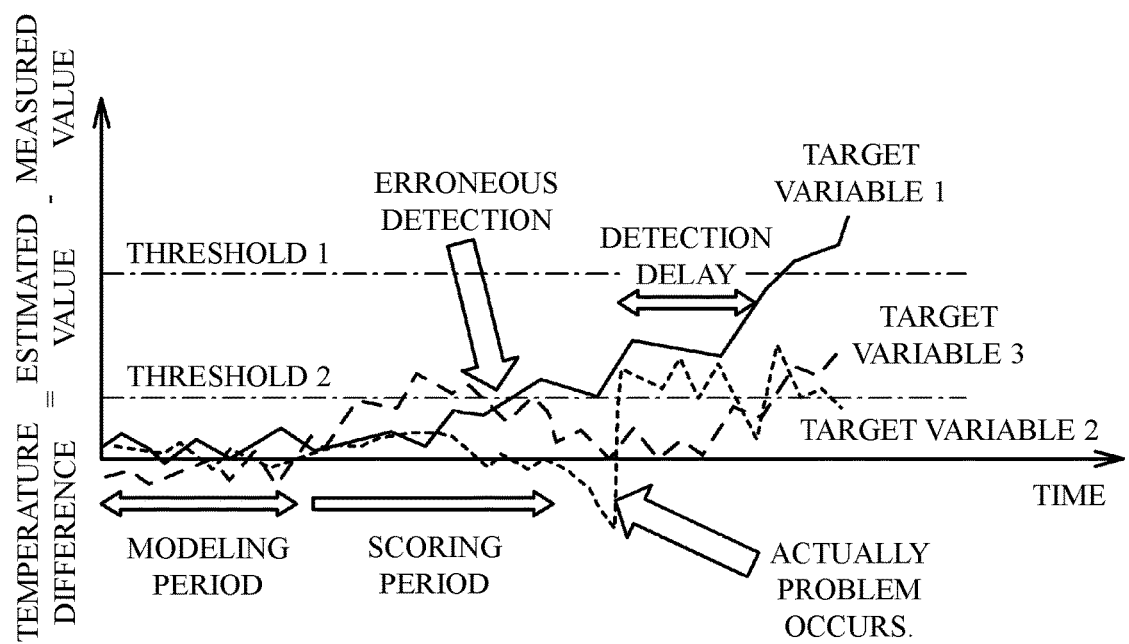
FIG. 4 illustrates a relationship between a threshold and abnormality determination.

FIG. 4 illustrates a relationship between a threshold and abnormality determination. As illustrated in FIG. 4, when the threshold is set to a relatively large threshold 1, a delay occurs with respect to a true problem and a countermeasure may be delayed. When the threshold is set to a threshold 2 smaller than the threshold 1, it is determined that abnormality occurs in a condition different from the condition in which the true problem occurs. Therefore, a function of detection of precursory phenomenon is not achieved. That is, a useful precursory phenomenon detection is difficult, unless an estimation with sufficient high accuracy is performed, useful thresholds are set with respect to target variables and abnormality determination with the thresholds is performed. It is not realistic in continuation of business that adequate thresholds are reviewed each time when a matter influencing on the thresholds such as a periodic check or changing of mixing ratio of oil types is updated.

In the following embodiments, a description will be given of a determination device, a determination method and a determination program that are capable of determining a precursory phenomenon of abnormality.

First Embodiment

Figure 5A:
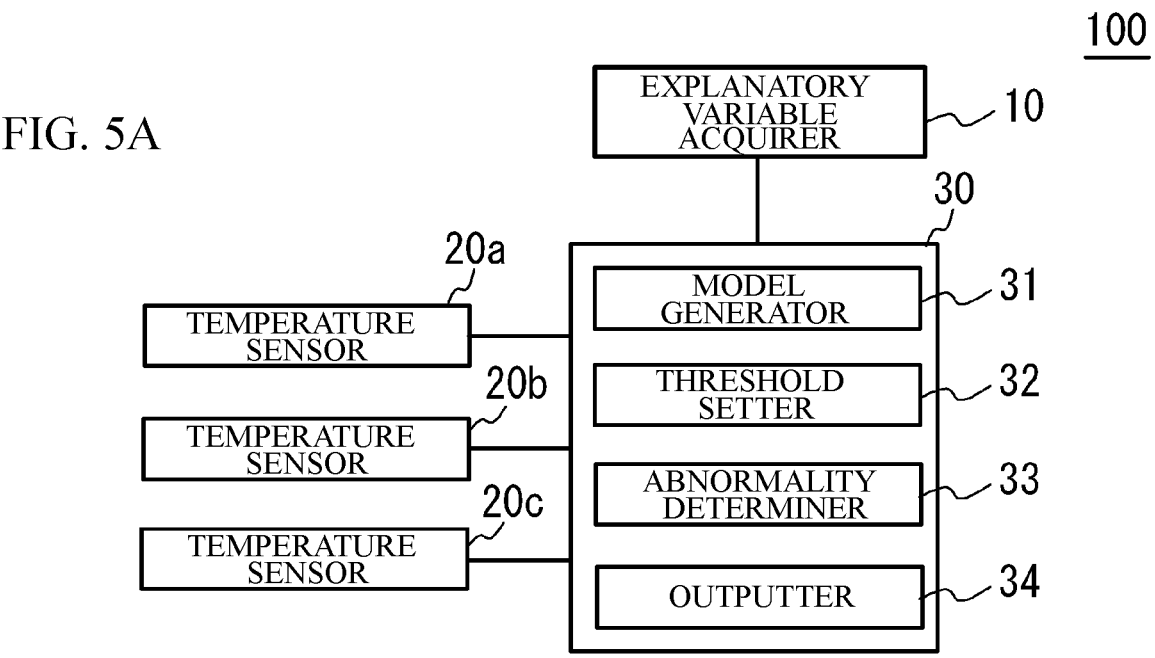
FIG. 5A illustrates a block diagram of a determination device in accordance with a first embodiment.

FIG. 5A illustrates a block diagram of a determination device 100 in accordance with a first embodiment. In the embodiment, the determination device 100 is equipped in a thermal electric power station for using a burning cycle of coal. The determination device 100 has an explanatory variable acquirer 10, a plurality of temperature sensors $20a$ to $20c$, a determiner 30 and so on. The determiner 30 has a model generator 31, a threshold setter 32, an abnormality determiner 33 and an outputter 34.

Figure 5B:
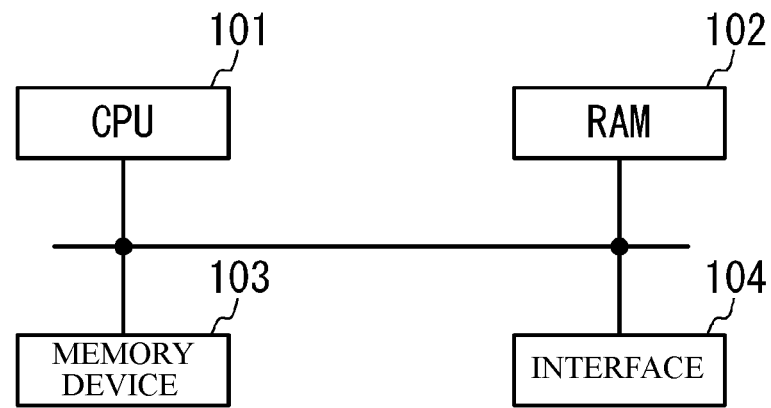
FIG. 5B illustrates a block diagram of a hardware structure of a determiner.

FIG. 5B illustrates a block diagram of a hardware structure of the determiner 30. As illustrated in FIG. 5B, the determiner 30 has a CPU 101, a RAM 102, a memory device 103, an interface 104 and so on. The components are connected by a bus or the like. The CPU (Central Processing Unit) 101 is a central processing unit. The CPU 101 has one or more cores. The RAM (Random Access Memory) 102 is a volatile memory that temporarily stores a program executed by the CPU 101, a data processed by the CPU 101, and so on. The memory device 103 is a non-volatile storage device. The memory device 103 may be a ROM (Read Only Memory), a solid state drive (SSD) such as a flash memory, or a hard disk driven by a hard disk drive. When the CPU 101 executes a determination program, the model generator 31, the threshold setter 32, the abnormality determiner 33 and the outputter 34 are established in the determiner 30. The model generator 31, the threshold setter 32, the abnormality determiner 33 and the outputter 34 may be a hardware such as dedicated circuits or the like.

Figure 6:
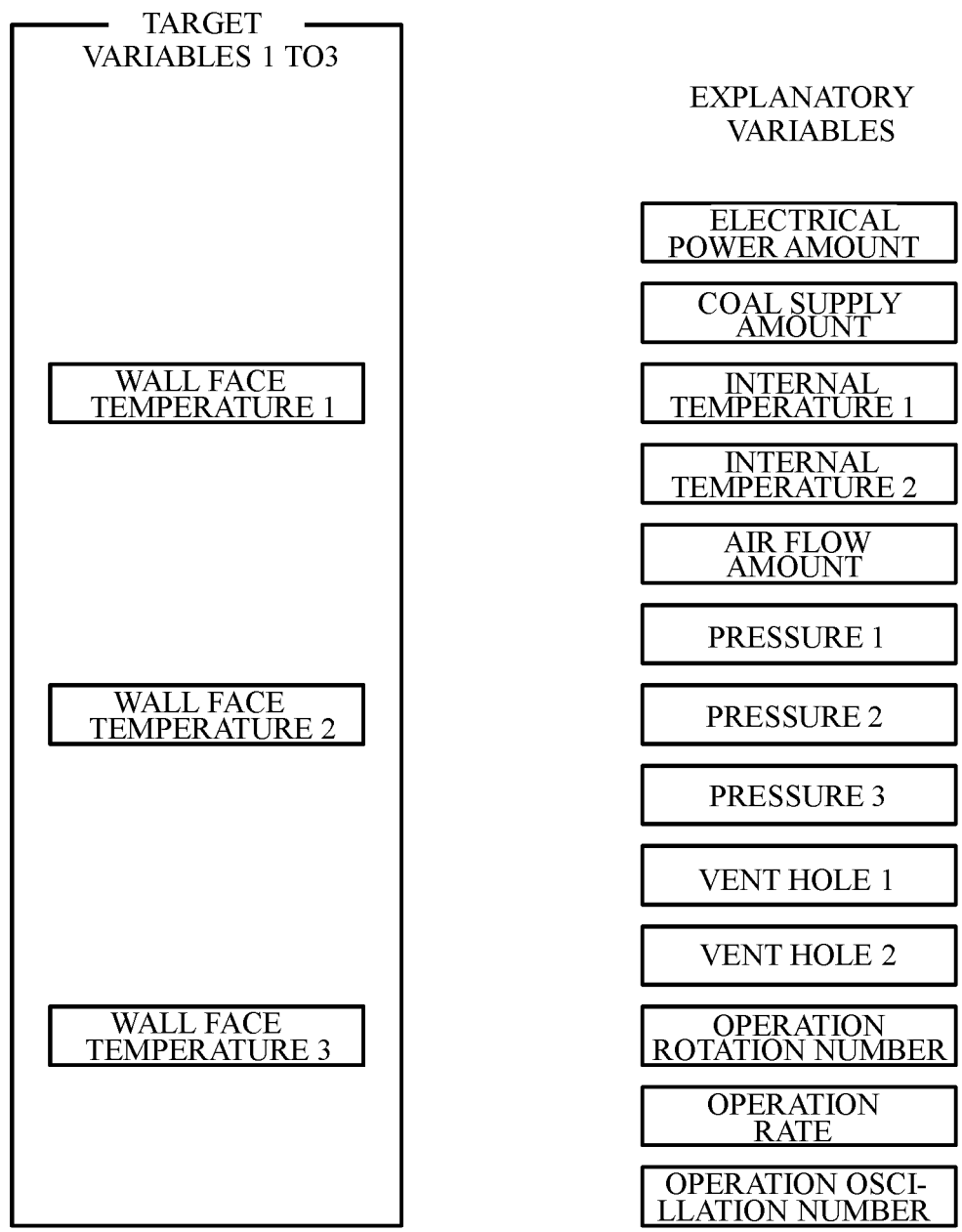
FIG. 6 illustrates explanatory variables.

The explanatory variable acquirer 10 acquires each explanatory variable. FIG. 6 illustrates an explanatory variable group. As illustrated in FIG. 6, the explanatory variables include an electrical power amount, a coal supply amount, an internal temperature 1, an internal temperature 2, an air flow amount, a pressure 1, a pressure 2, a pressure 3, a vent hole 1, a vent hole 2, an operation rotation number, an operation rate, an operation oscillation number and so on. Each explanatory variable has a correlation with target variables 1 to 3 (temperatures detected by the temperature sensors 20a to 20c). It is preferable that each explanatory variable is deemed to be independent from each other (low in multi-collinearity). The electrical power amount is electrical power generated by a thermal power generation. The coal supply amount is a coal amount supplied to a furnace. The internal temperatures 1 and 2 are temperatures of positions inside of the furnace. The air flow amount is a flow amount of air supplied to the furnace. The pressures 1 to 3 are pressures in pipes connected to the furnace. The vent holes 1 and 2 are temperatures of vent holes. The operation rotation number, the operation rate and the operation oscillation number are an operation rotation number, an operation rate and an operation oscillation number of the furnace. These explanatory variables are output values of sensors.

The plurality of temperature sensors 20a to 20c are provided at different positions of an external wall surface of the furnace. In the embodiment, the plurality of temperature sensors 20a to 20c are provided at three points. A temperature measurement method of the temperature sensors 20a to 20c is such as a method using a Raman scattering light in an optical fiber. For example, an optical fiber having a length of approximately 2 meters is rolled in a small area deemed to have approximately the same temperature, in order to accurately measure a temperature. In this manner, each rolled part of the optical fiber acts as a temperature sensor. In the embodiment, the wall temperatures 1 to 3 detected by the temperature sensors 20a to 20c are used as measured values of the target variables 1 to 3.

The model generator 31 generates estimated formulas of the target variables 1 to 3, with use of the explanatory variables acquired by the explanatory variable acquirer 10 and the detected values of the temperature sensors 20a to 20c. These estimated formulas are reference models of the target variables 1 to 3. The estimated formulas are obtained by setting a coefficient and a constant of each explanatory variable, as well as the estimated formulas illustrated in FIG. 2. It is possible to set these coefficients and constants on the basis of each past explanatory variable and the measured values of the temperature sensors 20a to 20c, by a regression analysis such as a least square regression, a main component regression, or a partial least square regression.

The threshold setter 32 sets a threshold in a deviation of the measured value of the target variable with respect to the reference model and sets a threshold in an estimated effective time. The deviation of the measured value of the target variable with respect to the reference model is such as an estimated error (=(the measured value of the target variable)−(the estimated value of the target variable)), an accumulated value of the estimated error obtained at every data updating, or a ratio of the measured value of the target variable with respect to the estimated value of the target variable. In the embodiment, the estimated error and the accumulated value of the estimated error are used as the deviation. The estimated value of the target variable is a value obtained by inputting an explanatory variable into the estimated formula. The estimated error of the target variable 1 is equal to (the measured value of the temperature sensor 20a)−(the estimated value of the target variable 1). The estimated error of the target variable 2 is equal to (the measured value of the temperature sensor 20b)−(the estimated value of the target variable 2). The estimated error of the target variable 3 is equal to (the measured value of the temperature sensor 20c)−(the estimated value of the target variable 3). The estimated effective time is a time from a starting of the measurement of the estimated error during a scoring period using the reference model until any of the above-mentioned deviations exceeds a threshold. The abnormality determiner 33 determines abnormality by determining whether the estimated effective time is less than the threshold. The outputter 34 outputs a signal associated with abnormality when the abnormality determiner 33 determines the abnormality.

Figure 7:
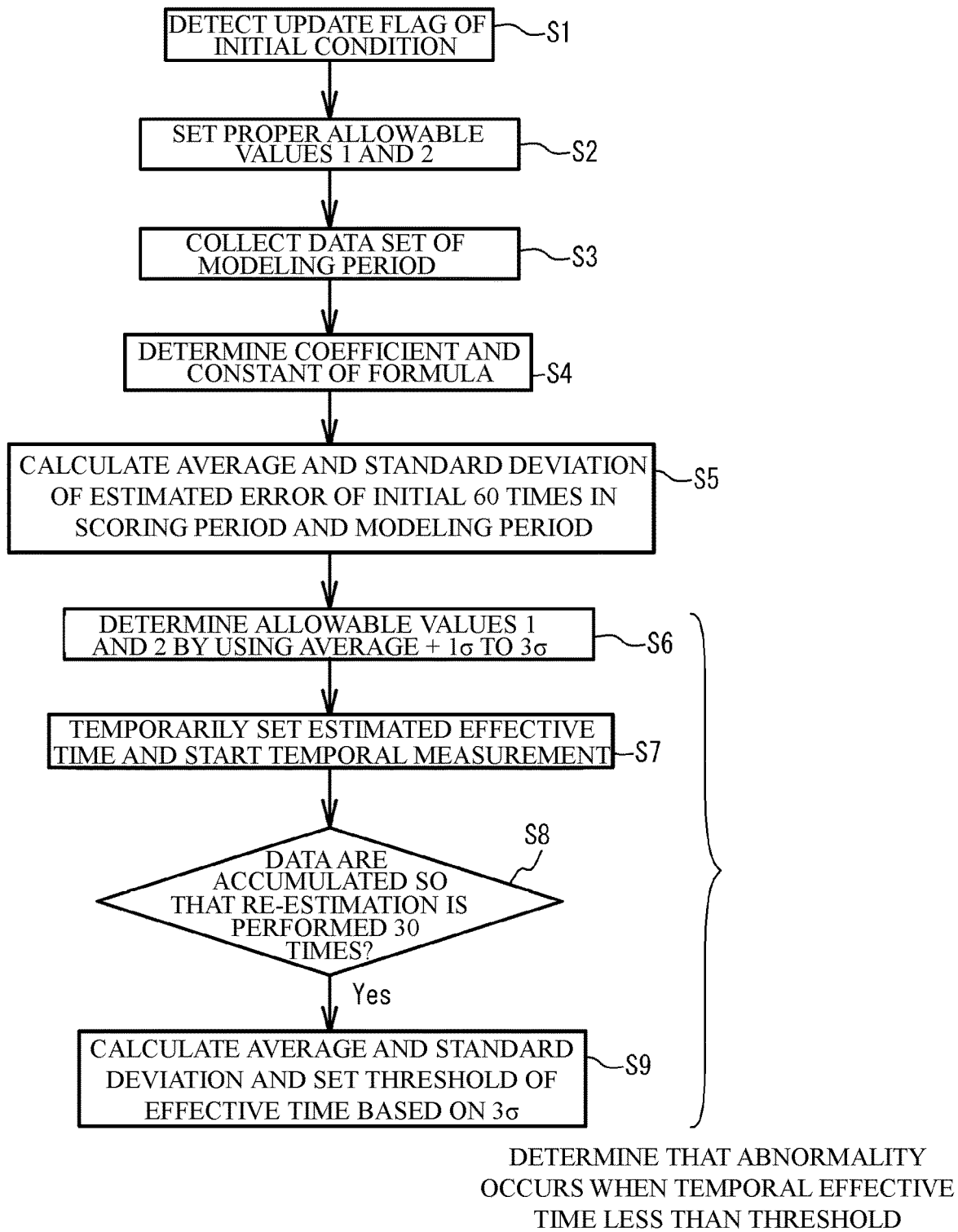
FIG. 7 illustrates a flowchart for setting an estimated formula of a target variable and setting thresholds of a deviation and an estimated effective time.

FIG. 7 is a flowchart illustrating a processing for setting the estimated formula of the target variable and setting thresholds of the deviation and the estimated effective time. As illustrated in FIG. 7, the threshold setter 32 detects a flag of updating of an initial condition (Step S1). The flag of updating of the initial condition is a flag acting as a trigger of updating the estimated formula of the target variable and the thresholds of the deviation and the estimated effective time. Next, the threshold setter 32 sets appropriate allowable values 1 and 2 (Step S2). The allowable value 1 is a threshold of the estimated error. The allowable value 2 is a threshold of the accumulated value of the estimated error.

Next, the model generator 31 collects a data set of a modeling period (Step S3). The data set includes explanatory variables at a predetermined interval of the modeling period and the detected values (measured values) of the temperature sensors 20a to 20c. Next, the model generator 31 determines coefficients and constants of the estimated formulas of the target variables 1 to 3 (Step S4) with use of the data set collected in Step S3. By the execution of Step S4, the estimated formulas of the target variables 1 to 3 are set.

Next, the threshold setter 32 starts measuring of the estimated error (scoring period), and calculates an average and a standard deviation of the estimated error of first 60 times (30 minutes in a case of 30 seconds cycle measurement) of the scoring period and the modeling period (Step S5). Next, the threshold setter 32 re-sets the average plus 1σ to 3σ as the allowable value 1. The threshold setter 32 re-sets the allowable value 2 so that the estimated effective time becomes approximately 60 to 240 times of a measurement cycle (30 minutes to 2 hours in a case of 30 seconds cycle measurement) (Step S6). Step S6 means releasing because the allowable values 1 and 2 are small when re-estimation is performed before 30 minutes in the scoring period in the case of 30 seconds cycle measurement.

Next, after re-setting of Step S6, the threshold setter 32 sets a temporary threshold of the estimated effective time and starts a temporary measurement of the estimated error (Step S7). Next, the model generator 31 repeats re-generation of the reference model when the estimated error exceeds the allowable value 1 or the accumulated value of the estimated error exceeds the allowable value 2. The threshold setter 32 determines whether data is accumulated of the degree that the re-generation is repeated 30 times (Step S8). When it is determined as "No" in Step S8, Step S8 is executed again. When it is determined as "Yes" in Step S8, the threshold setter 32 calculates the average and the standard deviation of the estimated effective time obtained in Step S8, and re-sets the threshold of the estimated effective time with use of $3\sigma$ (Step S9). The outputter 34 outputs a signal associated with an abnormality even when the temporary effective time is less than the threshold in Step S6 to Step S9.

It is possible to set the allowable values 1 and 2 and the threshold of the estimated effective time any number of times toward past time with use of a program installed in advance, once the data is accumulated. Therefore, it is not necessary to check the allowable values 1 and 2 by re-accumulating data after re-setting of the allowable values 1 and 2. And it is not necessary to check the threshold of the estimated effective time by re-accumulating data after re-setting of the estimated effective time. It is therefore possible to make a system in which only information indicating "changed" is input after a periodic check or changing of oil type.

Figure 8:
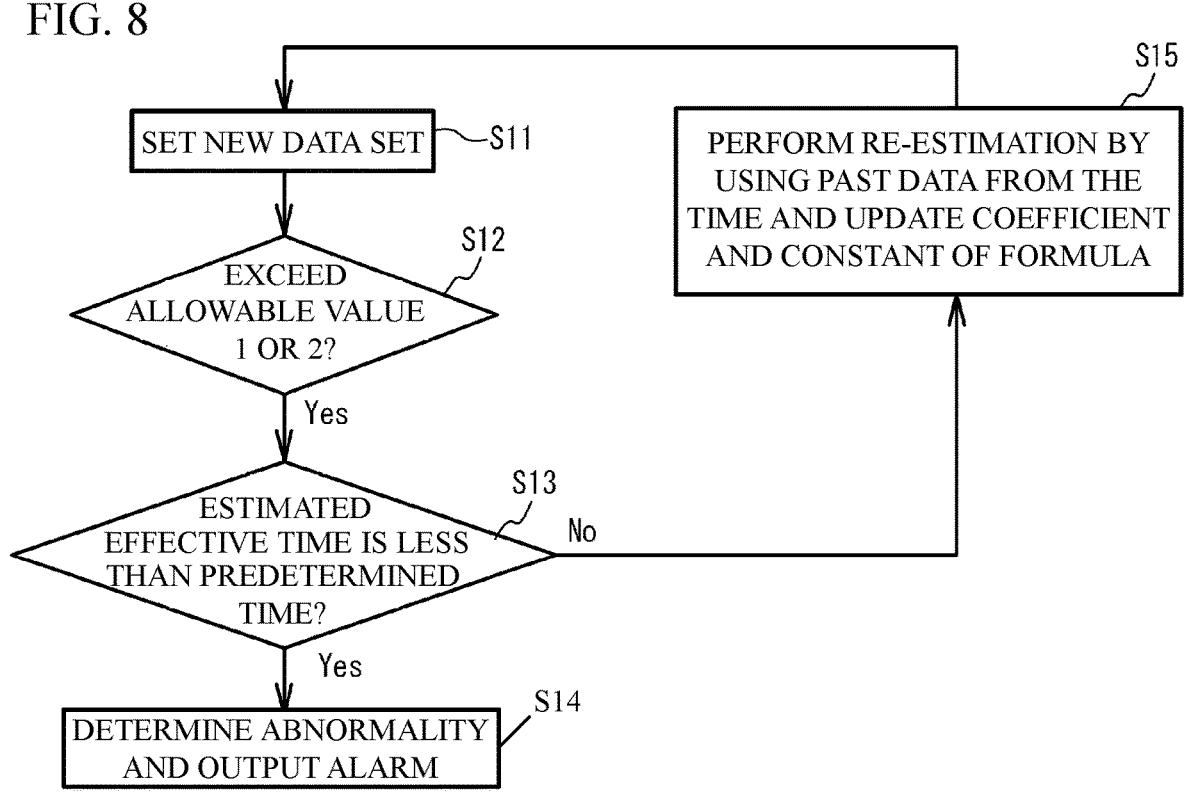
FIG. 8 illustrates an example of a flowchart that is executed when an abnormality determination is performed.

FIG. 8 illustrates an example of a flowchart that is executed when the abnormality determiner 33 performs an abnormality determination after the threshold setter 32 sets the allowable values 1 and 2 and the threshold of the estimated effective time. The abnormality determiner 33 collects a data set after the threshold setter 32 sets the allowable values 1 and 2 and the threshold of the estimated effective time (Step S11). Next, the abnormality determiner 33 determines whether the estimated error exceeds the allowable value 1 or the accumulated value of the estimated error exceeds the allowable value 2 (Step S12). When it is determined as "No" in Step S12, Step S12 is executed again. When it is determined as "Yes" in Step S12, the abnormality determiner 33 determines whether the estimated effective time is shorter than a predetermined time (for example, 10 minutes in a case of 30 seconds cycle measurement) (Step S13). When it is determined as "Yes" in Step S13, the outputter 34 outputs a signal associated with an abnormality (Step S14). When it is determined as "No" in Step S13, the abnormality determiner 33 performs a re-estimation with use of past data from that time (for example, 1 hour in the case of 30 seconds cycle measurement) and updates the coefficients and the constants of the estimated formulas (Step S15). After that, Step S11 is executed again.

In FIG. 8, the allowable value 1 is the threshold of the estimated error. The allowable value 2 is the accumulated value of the estimated errors per data updating. When a predetermined estimation is achieved, the average of the estimated error becomes approximately zero by averaging the estimated error in a long period. However, when a condition is different from the estimated error, one of a plus value and a minus value becomes larger. The threshold that is set with respect to the condition is the allowable value 2. Even if the average of the estimated error is around zero, the estimated error becomes larger when the condition unexpectedly occurs. Therefore, the condition may be considered as abnormality. The value in this case is the allowable value 1.

The allowable values 1 and 2 include ambiguity. Therefore, the measured estimated error may exceed the allowable value 1, or the accumulated value of the estimated error may exceed the allowable value 2. However, the model generator 31 performs the re-estimation at that time, updates the coefficients and the constants of the estimated formulas, and re-starts counting from the time as the estimation starting time. The period until the estimated error exceeds the allowable value 1 next time or the accumulated value of the estimated error exceeds the allowable value 2 is "the estimated effective time". In the method of FIG. 8, the threshold is set with respect to "the estimated effective time". In FIG. 8, two allowable values are set. However, the number of allowable values may be one or three or more. For example, when the value relating to the estimated error exceeds one or more allowable values and the value relating to the estimated error exceed one or more allowable values other than the above allowable values, "the estimated effective time" may be determined and the estimation may be performed again.

In the embodiment, a phenomenon of a frequent occurrence of exceeding of a threshold is allowed. On the other hand, an interval of the occurrence is important. In a thermal power station, a plant or other anticipated facilities, the phenomenon gradually changes. Therefore, an estimated error tends to become smaller after making a reference model. In the condition, when the estimated error is large, a phenomenon that is not expressed by a formula occurs. Therefore, when "the estimated effective time" becomes shorter, it can be determined that an abnormality occurs even if a setting of a threshold or ambiguity of estimation is considered. That is, in the embodiment, it is possible to determine whether a precursory phenomenon occurs.

In the embodiment, the threshold of the deviation of the temperature sensors 20a to 20c with respect to the reference model is determined on the basis of a deviation of a predetermined period after making the reference model. In this case, accuracy of setting of the threshold of the deviation is improved. In the embodiment, the threshold of the estimated effective time is determined on the basis of variability of time until the deviation exceeds the threshold. In this case, accuracy of setting of the threshold of the estimated effective time is improved.

Second Embodiment

In the first embodiment, the reference model is made with use of the sensor detection values and detection values of other sensors having a correlation with the sensor detection values. However, the structure is not limited. In a second embodiment, the reference model of the sensor detection value is made with use of a correlation with detection values of a plurality of sensors.

A description will be given of a method of detecting a precursory phenomenon for detecting an abnormality precursory phenomenon early from a correlation among temperature transition data detected by a plurality of temperature sensors. In this case, it is possible to use a method of calculating a Mahalanobis square distance calculated by an average of a target data set and a variance-covariance matrix, an MSD method of estimating a center or an expanse of data robustly and calculating a statistic amount corresponding to the Mahalanobis square distance, or the like.

These methods are referred to as "an outlier detection". A description will be given of a method (1) to (3) of detecting a precursory phenomenon for detecting abnormality early in concrete with use of calculation of the Mahalanobis square distance and n numbers of temperature data T1($t$), T2($t$), T3($t$) to Tn($t$).

(1) A modeling period (a period that accumulates data and is older than a current time) is set, and an average of temperature data of each of n numbers of temperature sensors in the modeling period, an unbised variance-covariance matrix of the temperature data set and an inverse matrix are calculated.

(2) A Mahalanobis square distance with respect to the temperature data set of the n numbers of temperature sensors of the modeling period is calculated with use of (1) with respect to the temperature data T1($m$) to Tn(m) of each time Tm (m=0, 1, 2 . . . ) in the modeling period. A threshold of abnormality is set from a standard deviation of the values (3σ and so on).

(3) The Mahalanobis square distance is calculated among the temperature data set of then numbers of the temperature sensors of the modeling period, every time when a data set T1(T) to Tn(T) at a new time T is obtained. And, it is determined whether the Mahalanobis square distance is equal to or less than the threshold.

The MSD method has the same method of setting a modeling period, determining a threshold from the modeling period, and sequentially comparing a new data set and the threshold. That is, in the detection of a precursory phenomenon by "the outlier value detection" with use of the correlation between each measured data, accuracy of the precursory phenomenon detection is determined by the setting of the threshold. That is, a useful detection of the precursory phenomenon is difficult unless "estimation is performed with sufficiently high accuracy, a useful threshold is set, and the abnormality determination is performed with use of the threshold". And so, in the second embodiment, a description will be given of a determination device, a determination method and a determination program that are capable of determining an abnormality precursory phenomenon.

Figure 9A:
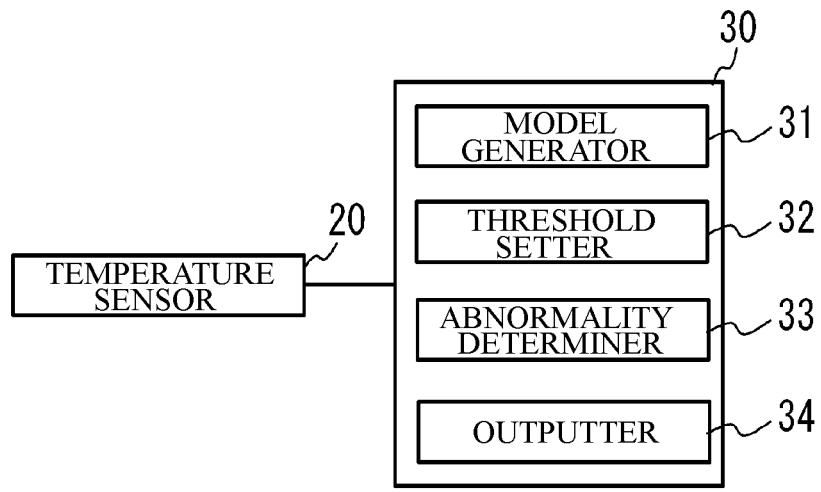
FIG. 9A schematically illustrates a determination device in accordance with a second embodiment.
Figure 9B:
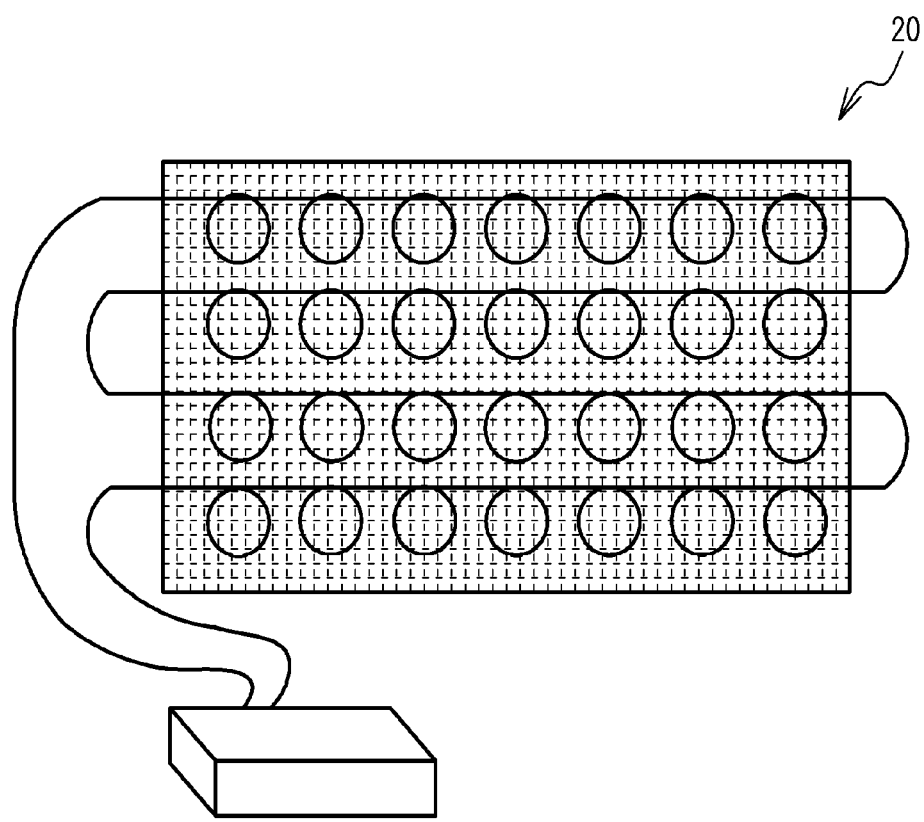
FIG. 9B illustrates an example of a temperature sensor.

FIG. 9A schematically illustrates a determination device 100$a$ in accordance with the second embodiment. The determination device 100$a$ is different from the determination device 100 of the first embodiment in a point that the explanatory variable acquirer 10 is not provided and a temperature sensor 20 is provided instead of the temperature sensors 20$a$ to 20$c$. The temperature sensor 20 detects a plurality of temperatures that have a correlation with each other. For example, as illustrated in FIG. 9B, the temperature sensor 20 detects each temperature on the basis of a back scattering light at different positions of a single optical fiber. In the example of FIG. 9B, each rolled part acts as an individual temperature sensor. The structure of the determiner 30 is the same as the first embodiment.

In the embodiment, the model generator 31 generates a reference model by calculating a Mahalanobis square distance that is calculated from an average and a variance-covariance matrix of detection values of positions detected by the temperature sensor 20. Alternatively, the model generator 31 generates the reference model by robustly estimating a center and an expanse of the detection values and using a MSD method for calculating a statistic amount corresponding to the Mahalanobis square distance. The reference model is a center of variability on which a correlation degree among the plurality of detection values (a direction when two sensors are noticed) influences.

The threshold setter 32 sets a threshold of the deviation of the measured value of the sensor detection value with respect to the reference model and sets a threshold of the estimated effective time. The deviation of the measured value of the target variable with respect to the reference model is such as a Mahalanobis square distance, an accumulated value of the Mahalanobis square distance calculated at each data updating, or the like. In the embodiment, the deviation is the Mahalanobis square distance and the accumulated value of the Mahalanobis square distance. The estimated effective time is a time from a time at which the measurement of the Mahalanobis square distance is started to a time at which any one of the deviations exceeds the thresholds in the scoring period. The abnormality determiner 33 determines whether an abnormality occurs by determining whether the estimated effective time is less than the threshold. The outputter 34 outputs a signal associated with an abnormality when the abnormality determiner 33 determines that the abnormality occurs.

Figure 10:
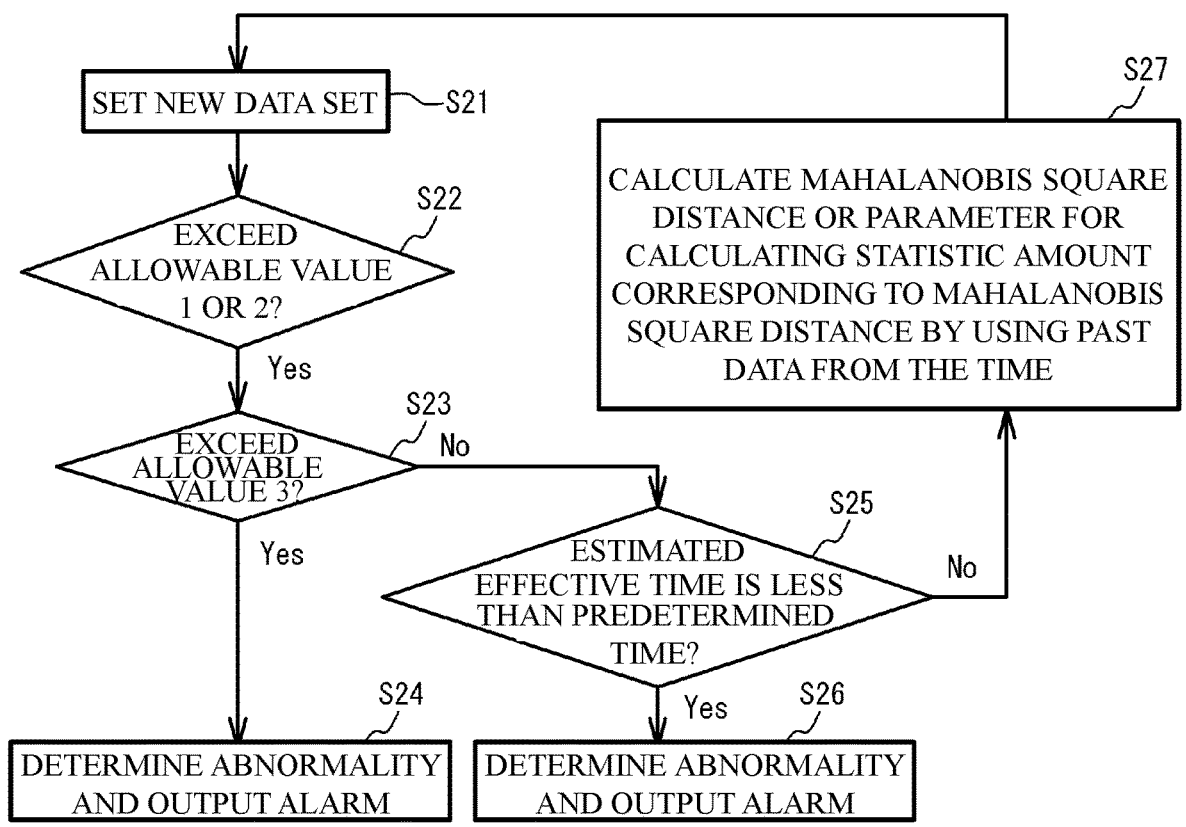
FIG. 10 illustrates an example of a flowchart that is executed when an abnormality determination is performed.

It is possible to set the reference model and set the thresholds of the deviation and the estimated effective time, by the same process as that of FIG. 7. The threshold setter 32 sets an allowable value 3 in addition to the allowable values 1 and 2 in advance. FIG. 10 illustrates an example of a flowchart executed when the abnormality determiner 33 determines whether the abnormality occurs after the threshold setter 32 sets the allowable values 1 and 2 and the threshold of the estimated effective time. The abnormality determiner 33 collects a data set after the allowable values 1 and 2 and the threshold of the estimated effective time are set by the threshold setter 32 (Step S21). The data set is collected from the detection values of the temperature sensor 20 at each position (Step S21).

Next, the abnormality determiner 33 determines whether any one position of the Mahalanobis square distances exceeds the allowable value 1 or the accumulated value of the Mahalanobis square distance of the position exceeds the allowable value 2 (Step S22). When it is determined as "No" in Step S22, Step S22 is executed again. When it is determined as "Yes" in Step S22, the abnormality determiner 33 determines whether the Mahalanobis square distance exceeds the allowable value 3 (Step S23).

When it is determined as "Yes" in Step S23, the outputter 34 outputs a signal associated with the abnormality (Step S24). When it is determined as "No" in Step S23, the abnormality determiner 33 determines whether the estimated effective time is less than a predetermined time (10 minutes in the case of measurement of 30 seconds cycle) (Step S25). When it is determined as "Yes" in Step S25, the outputter 34 outputs a signal associated with the abnormality (Step S26).

When it is determined as "No" in Step S25, the abnormality determiner 33 re-calculates the Mahalanobis square distance or a parameter for calculating a statistic amount in the MSD method corresponding to the Mahalanobis square distance with use of past data from that time (for example, 1 hour in the case of the measurement of the 30 seconds cycle) (Step S27). The parameter in this case includes an average value, an unbiased variance-covariance matrix and an inverse matrix of a new modeling period of each position of the temperature sensor 20. After that, Step S21 is executed again.

In the example of FIG. 10, three allowable values are set, and when the Mahalanobis square distance exceeds the allowable value 1 or the accumulated value exceeds the allowable value 2, the estimation is performed again with use of a new data set. Before that, the Mahalanobis square distance exceeds the allowable value 3, it is determined that the abnormality occurs. For example, in the case of calculating the Mahalanobis square distance, the Mahalanobis square distance calculated sequentially and the allowable value 1 are compared, and the accumulated value of the Mahalanobis square distance and the allowable value 2 are compared. When a plurality of temperatures at positions are measured and the plurality of temperatures transfer to a dangerous range, it is possible to say that the abnormality occurs even if the Mahalanobis square distance is small. In order to solve the problem, the allowable value 3 is set, and the allowable value 3 is compared with the measured data itself. The allowable value 3 is not a fixed value. And, each unique value of the allowable value 3 is determined with respect to each measured position. The number of the allowable values or the setting method is not limited to the example of FIG. 10.

In the embodiment, when the estimated effective time becomes shorter, it is determined that the abnormality occurs. It is therefore possible to determine whether the abnormality precursory phenomenon occurs. The threshold of the deviation of each detection value of the temperature sensor 20 with respect to the reference model is determined on the basis of the deviation in a predetermined period after generating of the reference model. In this case, the accuracy of setting the threshold of the deviation is improved. The threshold of the estimated effective time is determined on the basis of the variability of time until the deviation exceeds the threshold. In this case, the accuracy of setting the threshold of the estimated effective time is improved.

First Example

A description will be given of concrete examples in accordance with the above-mentioned embodiments. In a first example, the same target variables and the same explanatory variables as those of FIG. 6 were used in accordance with the first embodiment. A system of the first example has an object to predict whether the wall face temperatures 1 to 3 are kept in an adequate range from the explanatory variables, and to operate an operation cycle in the most effective condition. When the operation cycle becomes excessively higher temperature and excessively higher pressure, burning before the boiler occurs. When the operation cycle becomes excessively lower temperature, the burning efficiency in the boiler is reduced. It is demanded that an optimal temperature and an optimal pressure are controlled so that the burning does not occur.

With respect to these explanatory variables, thresholds are set as follows in accordance with the process of FIG. 7. In the first example, the same value is used as the target variables 1 to 3.
Allowable value 1 is plus minus 2 degrees C.
Allowable value 2 is plus minus 10 degrees C.
A threshold of an effective time is less than 20 minutes.

A modeling period of each estimation is one hour. A main component regression analysis was used for the estimation. A concrete method of the main component regression analysis is as follows.

(1) A variance-covariance matrix of 14 rows×14 columns is generated with use of values of the explanatory variables and the target variable 1 of the modeling period. In concrete, a dispersion of the target variable 1 is arranged in a last stage so as to be located at 14th row and 14th column.

(2) An inverse matrix is generated with respect to 13 rows×13 columns other than the row and the column of the target variable.

(3) The inverse matrix calculated in (2) is multiplied by the elements of (1) other than the element of the 14th column and 14th row. Thereby, 13 numbers of values are calculated. These are set to the coefficients of the explanatory variables.

(4) Averages of explanatory variables in the modeling period are calculated. The coefficients calculated in (3) are multiplexed with the averages, and resulting values are summed.

(5) Averages of the target variables of the modeling period are calculated. The values calculated in (4) are subtracted from the resulting values. The resulting values are set to the constants of the estimated formulas.

Figure 11A:
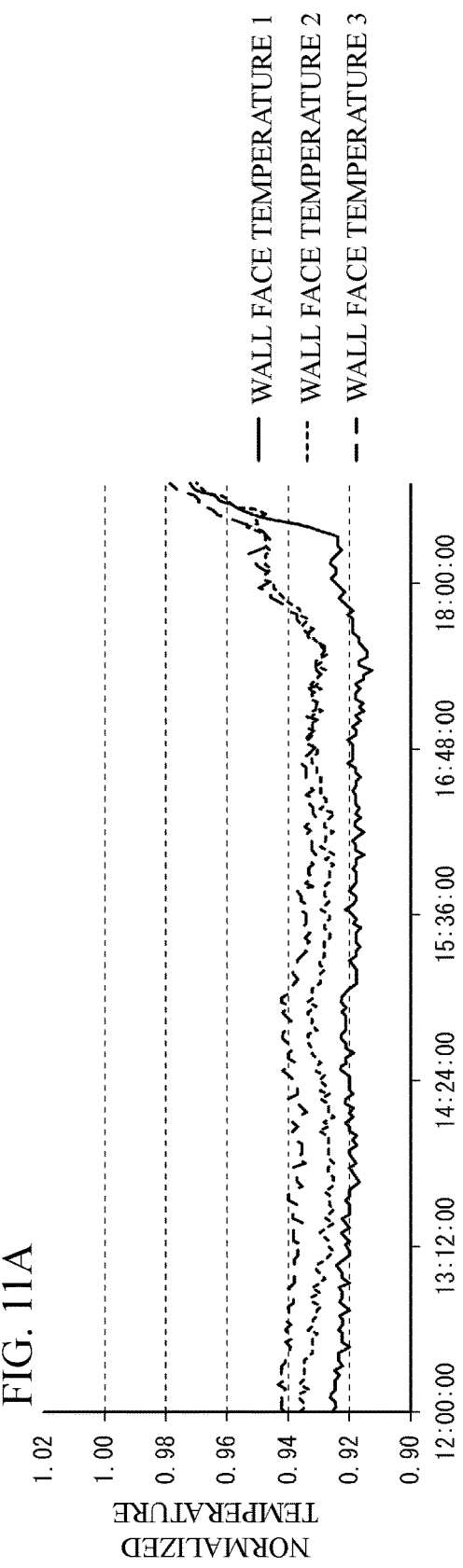
FIG. 11A illustrates measured values of target variables.
Figure 11B:
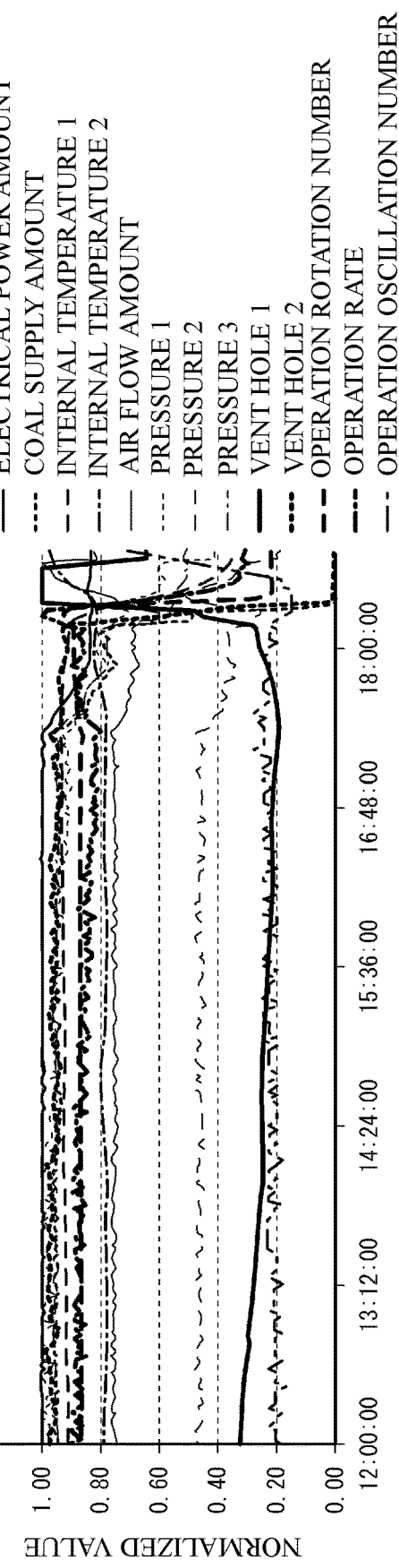
FIG. 11B illustrates measured values of explanatory variables.

In the example, the system operation is stopped as a system abnormality. As illustrated in FIG. 11A and FIG. 11B, an operation condition of the system was changed before or after 17:20. However, although abnormality accompanying the changing does not occur, each explanatory variable rapidly changed at 18:18. This is because the system operation was stopped. When the stop of the system operation at 18:18 is estimated as early as possible by a few minutes, the estimation is useful for the system.

Figure 12A:
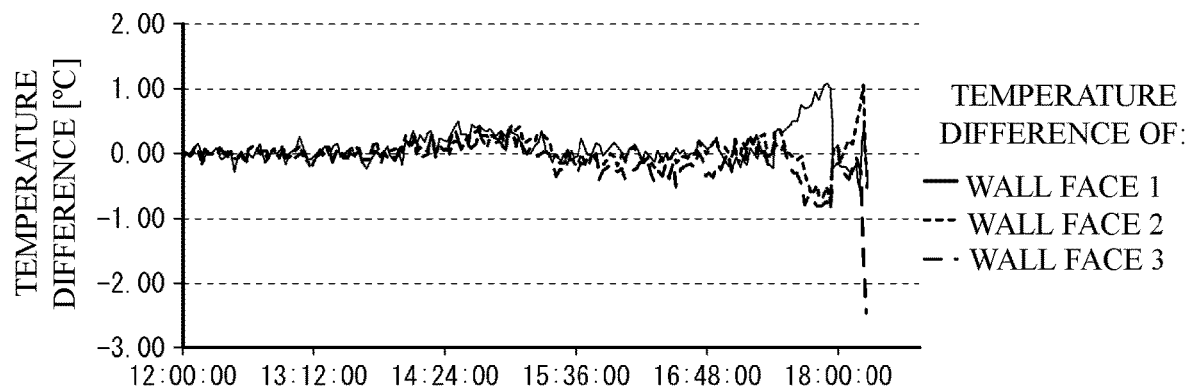
FIG. 12A illustrates a momentary value of an estimated error.
Figure 12B:
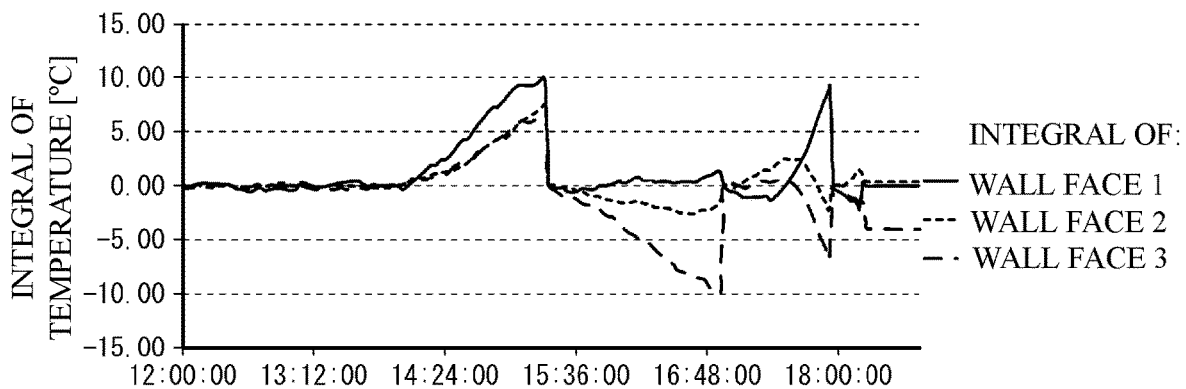
FIG. 12B illustrates an accumulated value of an estimated error.
Figure 12C:
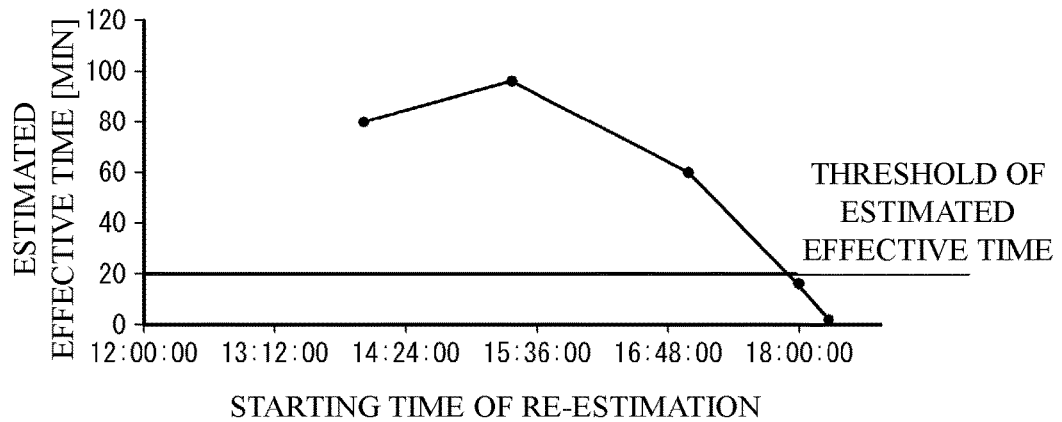
FIG. 12C illustrates an estimated effective time.

FIG. 12A illustrates a momentary value of the estimated error. FIG. 12B illustrates an accumulated value of the estimated error. FIG. 12C illustrates an estimated effective time. A position at which the accumulated value is reset to zero in FIG. 12B is the same as the data position of FIG. 12C. This is because the momentary value of FIG. 12A exceeds the allowable value 1 at the time or the accumulated value of FIG. 12B exceeds the allowable value 2 at the time, and the re-estimation was performed. As illustrated in FIG. 12A, as mentioned above, the estimated error just after starting of the re-estimation is small. When FIG. 11A, FIG. 11B and FIG. 12C are compared with each other, the estimated effective time gradually decreases toward 18:18, the condition for determining that the abnormality occurs at 18:12 that is 16 minutes after 17:55. However, the automatic determination of the abnormality is reasonable. The abnormality was confirmed 6 minutes before 18:18. It is therefore possible to output a stop instruction of the system.

Second Example

Figure 13:
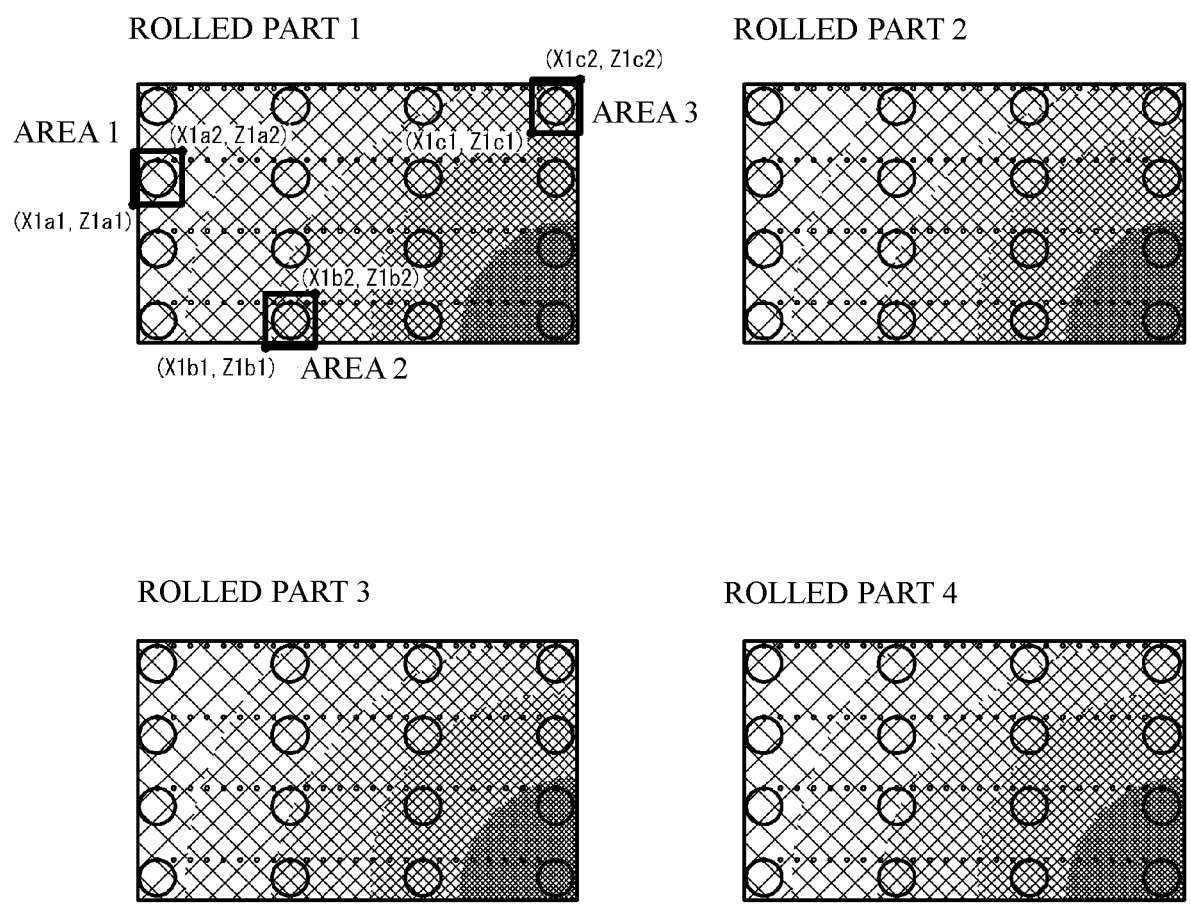
FIG. 13 illustrates an example of a temperature sensor.

A second example is an example in accordance with the second embodiment. As illustrated in FIG. 13, four rolled part groups were made and were respectively attached to the wall face of the furnace. The four rolled part groups were used as the temperature sensors. In FIG. 13, portions illustrated with a circle are the rolled part groups. The rolled part groups are connected with a single optical fiber. Temperature distribution is illustrated with anastomosis. A temperature is low in a rough anastomosis area. The temperature is high in a fine anastomosis area. When accumulation of excessive heat partially starts in each component, the temperature partially increases. It is therefore possible to detect the abnormality.

In the example, three rolled parts are extracted from each of the four rolled part groups. Thus, the precursory phenomenon detection of the abnormality is performed by performing a correlation analysis of 12 numbers of the rolled parts. In concrete, a lower left of each rolled part group is a reference origin (X, Z)=(0, 0) of a local coordinate. An area is set by determining two points of a lower left and an upper right included in each rolled part. That is, areas are designated by coordinates as follows.

Rolled part group 1: area 1: (X1a1, Z1a1), (X1a2, Z1a2);
   area 2: (X1b1, Z1b1), (X1b2, Z1b2); and
   area 3: (X1c1, Z1c1), (X1c2, Z1c2)
Rolled part group 2: area 1: (X2a1, Z2a1), (X2b2, Z2a2); and
   area 2: (X2b1, Z2b1), (X2b2, Z2b2)

Moreover, an average, a maximum value and a minimum value are calculated from the temperatures of each position of the optical fiber included in each area. The values are used as temperature data of each area. In the system, a threshold is respectively set with respect to 12 numbers of the temperatures. The values are the allowable values 3. In the example, the temperature never exceeded a temperature corresponding to the allowable value 3. Therefore, only the allowable values 1 and 2 and the effective time threshold were set.

The allowable value 1 is set with respect to the Mahalanobis square distance of the data in the modeling period used at that time of a new data set. The allowable value 2 is set with respect to the average of the Mahalanobis square distance one sample before and the Mahalanobis square distance of the new data set.

An integration value is not used. The reason is as follows. The Mahalanobis square distance is a degree of a distance of a new data set from a gravity center of the data set of the modeling period. The Mahalanobis square distance indicates different values between cases where elements are added in terms of vector components and a data set is updated so as to rotate with a predetermined distance and a case where the elements cross a gravity center and are transferred to a different quadrant. However, it seems the Mahalanobis square distances are the same in a scalar addition.

Figure 14A:
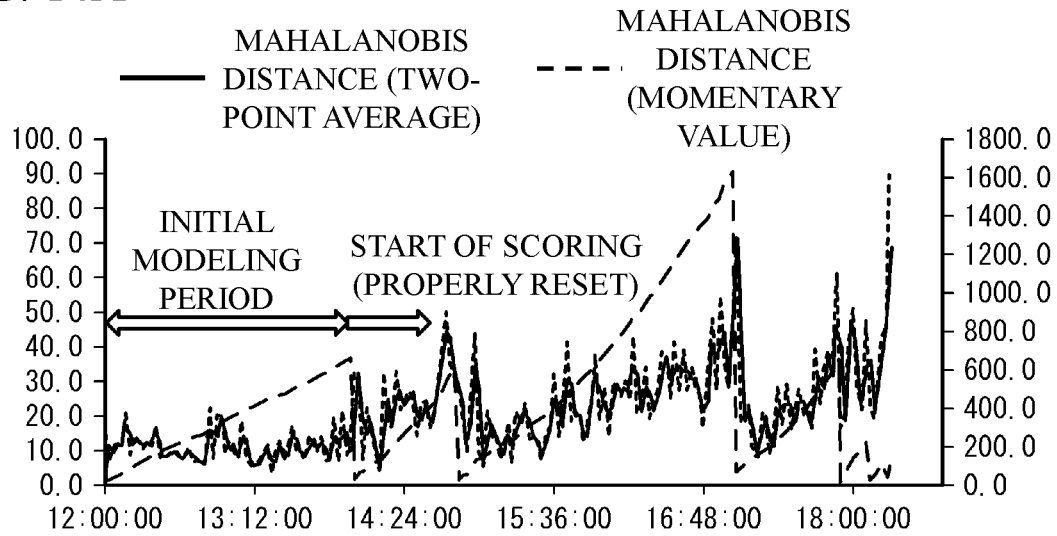
FIG. 14A illustrates a Mahalanobis distance.
Figure 14B:
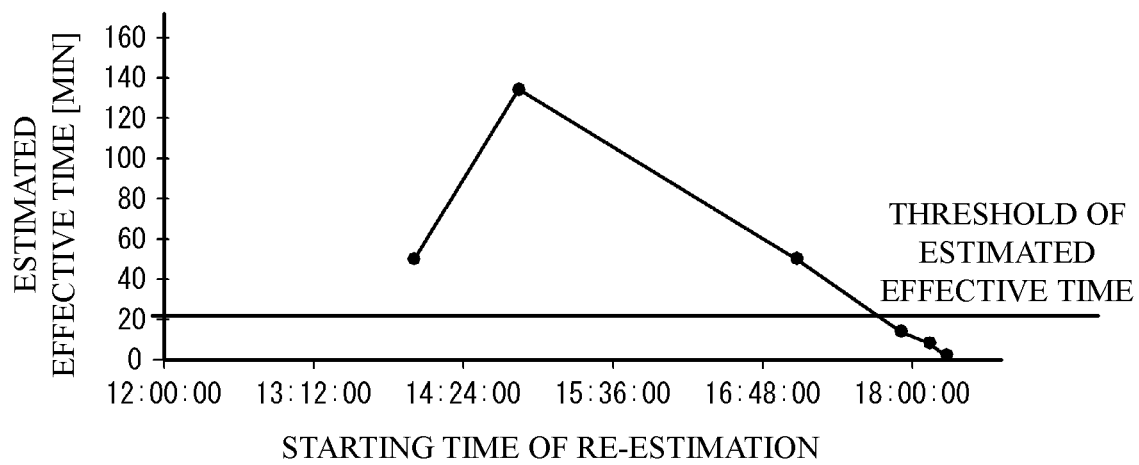
FIG. 14B illustrates an estimated effective time.

And so, the average is adopted as the allowable value 2, on a presumption that data within a close range are directed to the same direction when the data set gradually come off.
The allowable value 1: 60
The allowable value 2: 50
The threshold of the effective time: less than 20 minutes The calculation of the Mahalanobis square distance is mentioned above. In concrete, FIG. 14A and FIG. 14B illustrate results of the precursory phenomenon detected by calculating the Mahalanobis square distance. As illustrated in FIG. 14A, the Mahalanobis square distance becomes the smallest just after the modeling period in the scoring period. The Mahalanobis square distance becomes larger as the time passes. However, the increase tendency differs in each time band. The estimated effective time set to 50 minutes by the re-estimation at 17:04 becomes shorter after that. The estimated effective time re-estimated at 17:54 is 14 minutes. The estimated effective time re-estimated at 18:08 is 8 minutes. By comparison with the threshold of 20 minutes, the abnormality was confirmed at 18:08 that is 14 minutes after 17:54. This is 10 minutes early from 18:18 at which the system was stopped. In the example, the stop of system is described. However, a probability for securing a time for an initial response is achieved even if a precursory phenomenon of an actual accident may occur.

First Modified Embodiment the first embodiment and the second embodiment, the temperature measurement method of the plurality of temperature sensors 20a to 20c or the temperature sensor 20 uses a Raman scattering light in an optical fiber. However, the structure is not limited. For example, a thermocouple, a resistance temperature detector, an infrared thermography of camera type or the like may be used as the temperature sensors 20a to 20c or the temperature sensor 20.

However, when the thermocouple or the resistance temperature detector is used, it is necessary to provide two conductive wires that are electrically insulated from each other and are electrically insulated from the wall face, with respect to each measurement point. When an infrared thermography is used, it is necessary that: the temperature of the face to be measured is not kept; it is possible to take an image of the face to be measured from outside without a shield; a plurality of temperature data near the position corresponding to the measurement point are summarized into a one point by averaging; and an emissivity of the external wall face is obtained in advance in order to convert a brightness into a temperature precisely.

In the first embodiment and the first example, the temperature is the target variable and the other sensing data are the explanatory variables. However, the target variables may be determined from the other sensing data, and the temperatures to be measured may be explanatory variables together with the other sensing data. It is only necessary to remark on values. Therefore, for example, the electrical power amount may be used as the target variable. And, it may be determined that an efficiency of the electrical power generation system is degraded when the abnormality precursory phenomenon occurs. This may be applied to the second embodiment and the second example. For example, the above-mentioned embodiments may be applied to the other sensing data instead of the temperature sensor 20. This will be described in a fourth example described later.

Second Modified Embodiment

Figure 15:
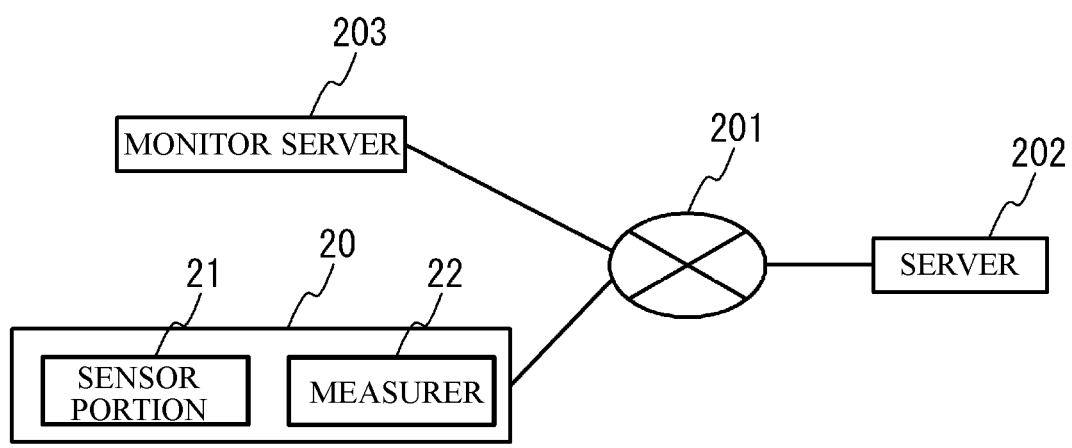
FIG. 15 illustrates a determination system in accordance with a second modified embodiment.

FIG. 15 illustrates a determination system in accordance with a second modified embodiment. In the second modified embodiment, the determiner 30 acquires a data directly from the temperature sensor 20. On the other hand, in the determination system in accordance with the second modified embodiment, a server acting as the determiner acquires a data from a temperature sensor via an electrical communication line.

The determination system in accordance with the second modified embodiment has the temperature sensor 20, a server 202, and a monitor server 203. The temperature sensor 20 has a sensor portion 21 for acquiring a temperature data of a measurement object and a measurer 22 for acquiring a measurement data from the sensor portion 21 and generating the temperature data.

The temperature sensor 20 is coupled to the server 202 via the electrical communication line 201 such as internet. The monitor server 203 for monitoring the measurement object on which the sensor portion 21 is set is coupled to the electrical communication line 201. The server 202 has the CPU 101, the RAM 102, the memory device 103, the interface 104 and so on of FIG. 5B and acts as the determiner 30.

In the determination system, the server 202 equipped in Japan receives a measurement data that is measured in a coal banker of an electrical power station in a foreign county, and detects a precursory phenomenon of abnormal heat generation in the coal banker. A result output from the server 202 is transmitted to the monitor server 203.

The modified embodiment can be applied to the first embodiment. For example, the plurality of temperature sensors 20a to 20c may be used instead of the temperature sensor 20.

Third Modified Embodiment

Figure 16A:
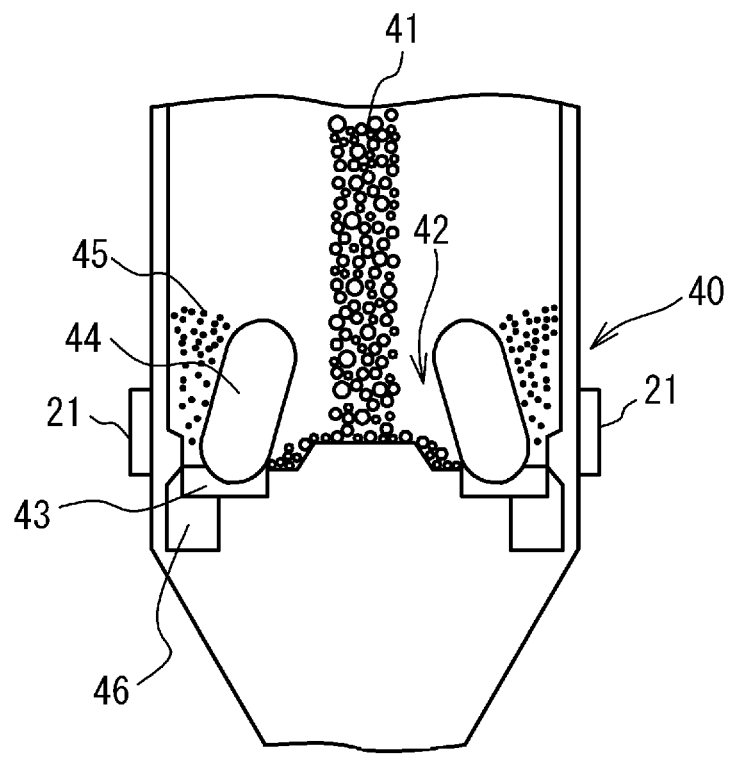
FIG. 16A and FIG. 16B illustrate a sensor portion and a measurer.
Figure 16B:
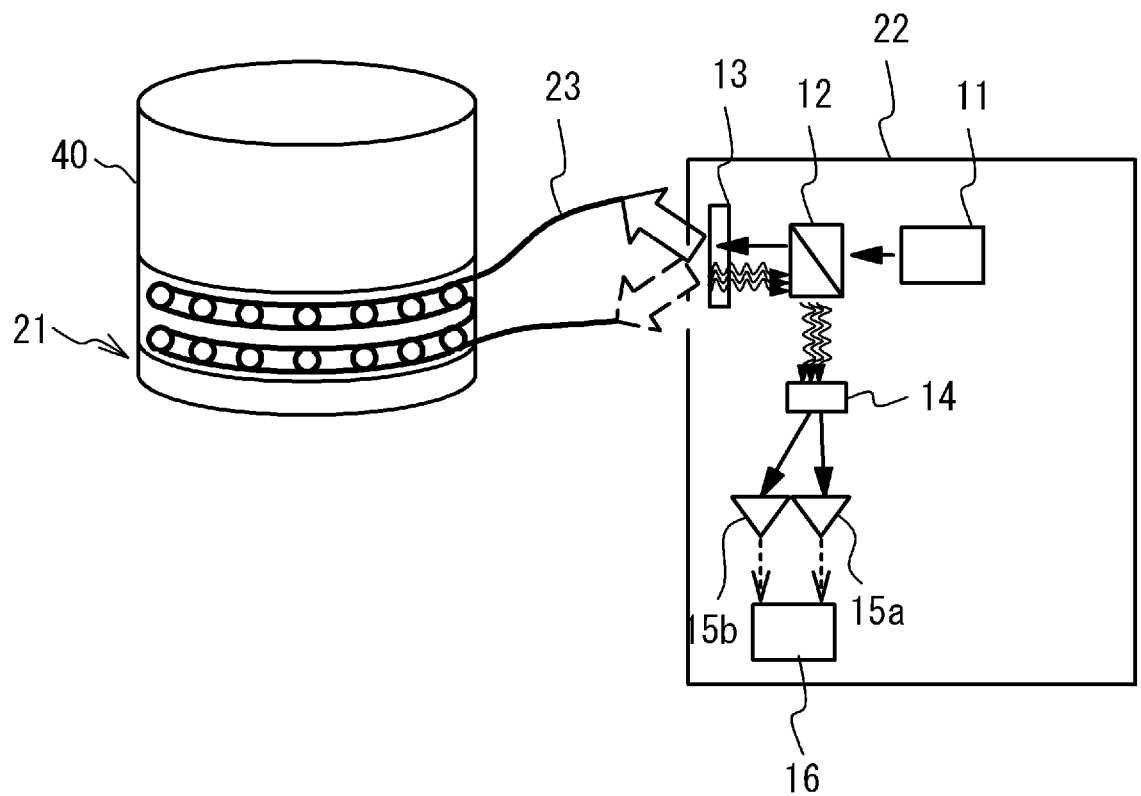

FIG. 16A and FIG. 16B illustrate the sensor portion 21 and the measurer 22. As illustrated in FIG. 16A, the sensor portion 21 is attached to an external wall of a mill intermediate housing 40 of a coal mill for crushing coal and producing finely-crushed coal. As illustrated in FIG. 16A, the mill intermediate housing 40 has a pool 42, a crusher ring 43 and a roller 44. Coal 41 drops in the pool 42 and is temporarily pooled in the pool 42. The crusher ring 43 and the roller 44 crush the coal 41 pooled in the pool 42. Crushed coal 45 obtained by crusher moves upward by air in a first air chamber 46.

As illustrated in FIG. 16B, the measurer 22 has a laser 11, a beam splitter 12, an optical switch 13, a filter 14, a plurality of detectors 15a and 15b, a calculator 16 and so on. The laser 11 is a light source such as a semiconductor laser. The laser 11 emits a laser light of a predetermined wavelength range. For example, the laser 11 emits an optical pulse (laser pulse) at a predetermined time interval. The beam splitter 12 inputs an optical pulse emitted by the laser 11 into the optical switch 13. The optical switch 13 switches destinations (channels) of the optical pulse. In a double end method, the optical switch 13 alternately inputs an optical pulse into a first end and into a second end of the optical fiber 23 at a predetermined cycle. In a single end method, the optical switch 13 inputs an optical pulse into one of the first end and the second end of the optical fiber 23. The optical fiber 23 is arranged along a predetermined path of a temperature measurement object.

The optical pulse input into the optical fiber 23 propagates in the optical fiber 23. The optical pulse propagates in the optical fiber 23, generates a forward-scattering light progressing toward a propagation direction and a back-scattering light progressing toward a return direction (returning light), gradually attenuates, and propagates in the optical fiber 23. The back-scattering light passes through the optical switch 13 and is input into the beam splitter 12 again. The back-scattering light input into the beam splitter 12 is emitted toward the filter 14. The filter 14 is a WDM coupler or the like, and extracts a long wavelength component (Stokes component) and a short wavelength component (anti-Stokes component) from the back-scattering light. The detectors 15a and 15b are a photo diode. The detector 15a converts light intensity of the short wavelength component of the back-scattering light into an electrical signal and transmits the electrical signal to the calculator 16. The detector 15b converts light intensity of the long wavelength component of the back-scattering light into an electrical signal, and transmits the electrical signal into the calculator 16. The calculator 16 uses the Stokes component and the anti-Stokes component and measures temperature distribution information of an extension direction of the optical fiber 23.

Figures 17A, 17B, 17C:
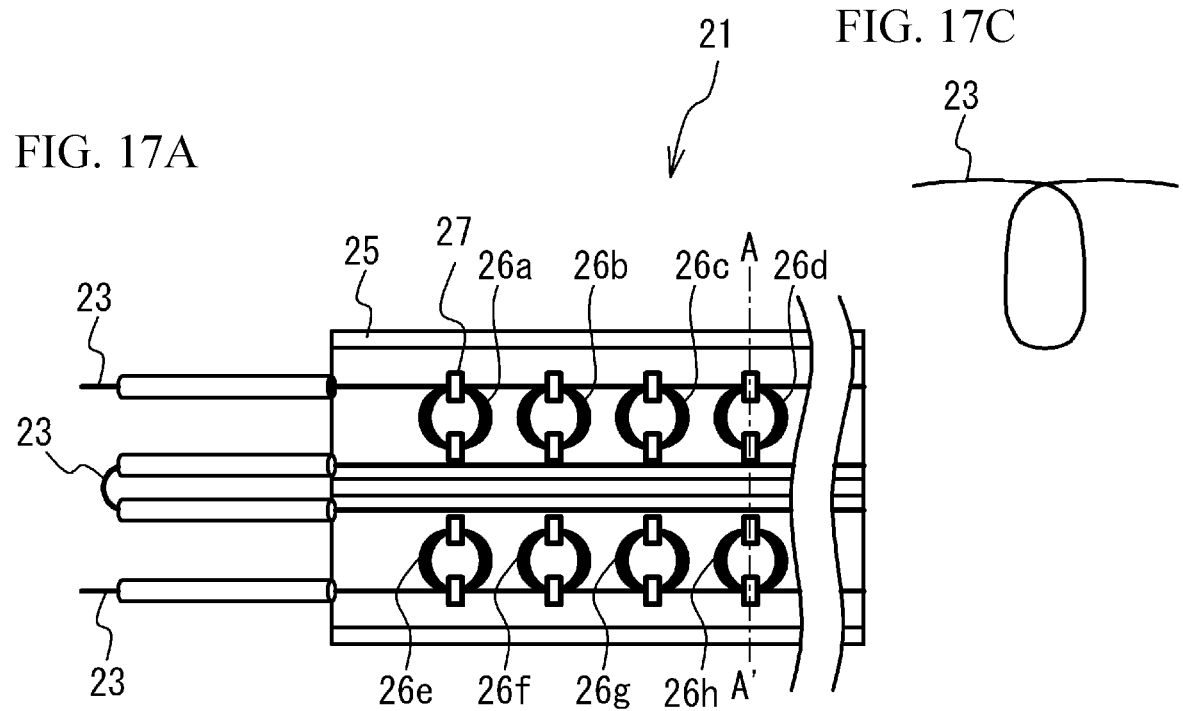
FIG. 17A to FIG. 17C illustrates a sensor portion.

FIG. 17A illustrates a permeated view of the sensor portion 21. In FIG. 17A, a sheet 24b of FIG. 17B is permeated. FIG. 17B illustrates a cross sectional view taken along a line A-A of FIG. 17A. The sensor portion 21 is a fiber sheet on which the optical fiber 23 is arranged on a predetermined position. As illustrated in FIG. 17A and FIG. 17B, the sensor portion 21 has a pair of sheets 24a and 24b sandwiching and holding the optical fiber 23, a glass cross tape 25 holding a gap between the sheets 24a and 24b, and a metal pipe 27 that roughly determines a position of the rolled part 26 of the optical fiber 23 and has a slit.

The optical fiber 23 has rolled parts 26a to 26h (hereinafter referred to as a rolled part 26). The rolled parts 26a to 26h are held by the sheets 24a and 24b. FIG. 17C illustrates an example where the optical fiber 23 is rolled once. The rolled parts 26a to 26h may be structured by a single optical fiber 23, or may be structured by two optical fibers 23 including a lower optical fiber and an upper optical fiber. In the latter case, for example, as illustrated in FIG. 17A, the lower optical fiber and the upper optical fiber are fused and connected with each other at a connection portion. The sheet 24a contacts to the measurement object. An adhesive tape 28 is provided on the sheet 24a. It is therefore possible to affix the sheet 24a to the temperature measurement object.

The rolled parts 26a to 26h are, for example, rolled twice to eight times. In the case of the rolled part that is rolled four times, an internal diameter of the metal pipe 27 is 1 to 2 mm that is twice or more of the diameter of the optical fiber 23, because the diameter of the optical fiber 23 is 0.16 to 0.4 mm that may differ in accordance with a resistance temperature. A plate thickness of the metal pipe 27 is approximately 0.5 mm. Therefore, the metal pipe 27 has a thickness of approximately 2 to 3 mm from the sheet 24a to the sheet 24b.

In the second embodiment, the average, the maximum value, the minimum value and so on are calculated from the temperatures of positions of the optical fiber included in each region, and these values are used as the temperature data of each region. However, the rolled part 26 of the third modified embodiment has a thickness as illustrated in FIG. 17B. Therefore, a temperature away from an object of the rolled part 26 may be largely off from an actual temperature of the object.

And so, a few points determined in advance are selected from temperature values of a plurality of measurement points included in the rolled parts 26a to 26h. For example, five points are selected in a descending order. And, an average is calculated from the selected values. And the average is used as a temperature of a region corresponding to each rolled part. Thus, accuracy of the measured temperature is improved. And it is possible to detect the precursory phenomenon of an abnormality of the temperature of the measurement object with higher accuracy.

Third Embodiment

A description will be given of a third embodiment for an embodiment having an object different from the second embodiment. The second embodiment illustrated in FIG. 10 uses various sensing data. However, a concrete method of using the data is not described. And so, in the third embodiment, the method of using the data will be described. The method itself is the same as the method disclosed in Japanese Patent No. 5308501 disclosing a conversion into a probability variable. The method is a general method in a normal multivariate analysis.

Figure 18:
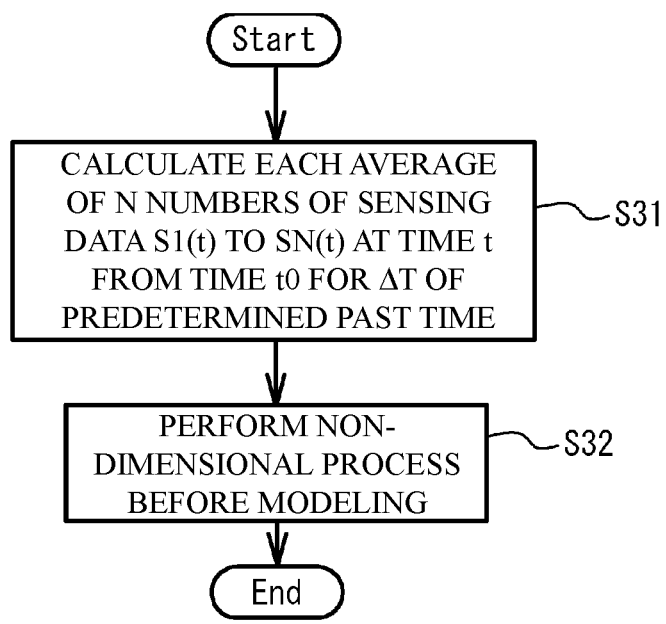
FIG. 18 illustrates a flowchart of a non-dimensional process.

FIG. 18 illustrates a flowchart of a non-dimensional process in a case where a modeling is performed with use of N numbers of sensing data $S1(t)$ to $SN(t)$ at a time "t". The non-dimensional process is performed in a case where the model generator 31 executes Step S3 and Step S4 of FIG. 7 and a case where the abnormality determiner 33 executes Step S15 of FIG. 8 or Step S27 of FIG. 10. The N numbers of sensing data $S1(t)$ to $SN(t)$ are the target variables and the explanatory variables. Here, a description will be given of the case where the model generator 31 is a subject.

The model generator 31 calculates an average and a standard deviation of sensing data of a predetermined past time (modeling period) before a current reference time "t" (Step S31). Averages $S1\_ave$ to $SN\_ave$ of N numbers of sensing data S1(*t*) to SN(t) at the time "t" for a predetermined past time ΔT used for the modeling from the time "t0" are expressed as follows.

$$S1\_ave = \text{Average}(S1(t0), \ldots, S1(t0-\Delta T)),$$

$$S2\_ave = \text{Average}(S2(t0), \ldots, S2(t0-\Delta T)),$$

. . .

$$SN\_ave = \text{Average}(SN(t0), \ldots, SN(t0-\Delta T))$$

Standard deviations S1_sigma to SN_sigma are expressed as follows.

$$S1\_sigma = \text{Standard Deviation}(S1(t0), \ldots, S1(t0-\Delta T)),$$

$$S2\_sigma = \text{Standard Deviation}(S2(t0), \ldots, S2(t0-\Delta T)),$$

. . .

$$SN\_sigma = \text{Standard Deviation}(SN(t0), \ldots, SN(t0-\Delta T)),$$

Next, the model generator 31 obtains a zero reference value by subtracting each average from each sensing data in order to calculate a parameter, and divides each resulting value by a standard deviation or a few times of the standard deviation (Step S32). Thus, each sensing data is normalized into a non-dimensional value. When the abnormality determiner 33 performs the non-dimensional process, the non-dimensional process is performed with respect to a new data set in order to execute Step S11 of FIG. 8 or Step S21 of FIG. 10.

In accordance with the above-mentioned non-dimensional process, an average of each sensing data is zero in the modeling period. And, variability of each sensing data becomes even. It is possible to correct the variability of each sensing data with a method of calculating parameters described later. Therefore, each sensing data may be divided by each calculated average without a standard deviation, and parameters may be calculated by the resulting values. In this case, the average of the modeling period becomes "1". With the non-dimensional process, it is possible to treat sensing data having a different dimension such as the wall face temperatures 1 to 3, the electrical power amount, the coal supply amount or the pressures 1 to 3 by the method of FIG. 8 or FIG. 10.

Figure 19A:
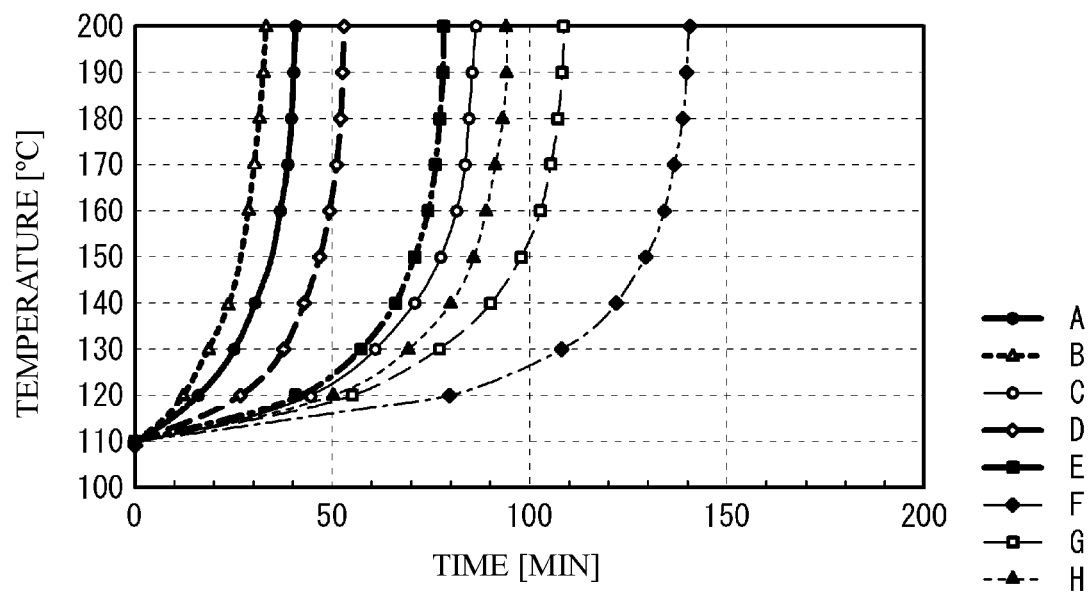
FIG. 19A and FIG. 19B illustrate an abnormality precursory phenomenon.
Figure 19B:
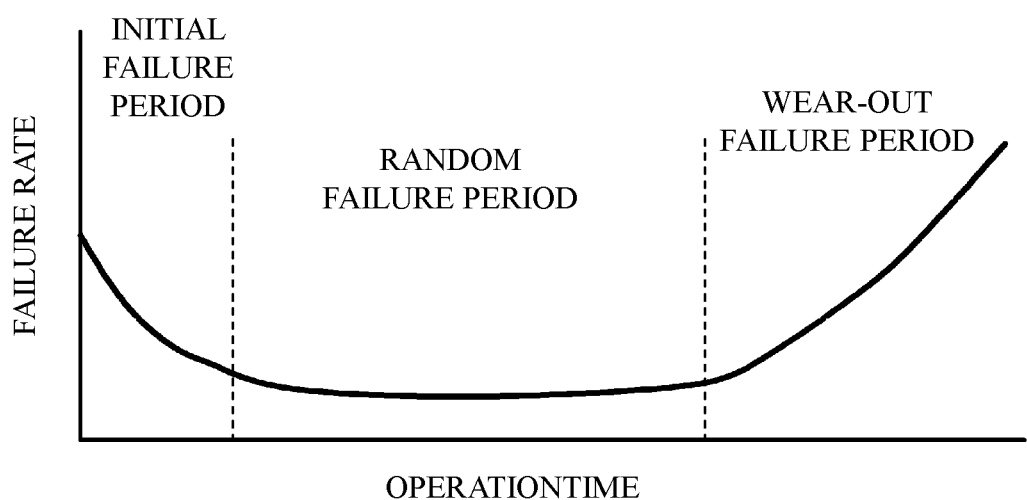

Usually, an abnormality precursory phenomenon in a plant is not a case where only one phenomenon occurs and the condition returns to normal but a case where a condition is gradually degraded, an abnormality precursory phenomenon frequently occurs at an increasing tempo, the abnormality precursory phenomenon continuously occur and an accident occurs as in the case of spontaneous combustion of coal illustrated in FIG. 19A or degradation of a bearing illustrated in FIG. 19B. It is necessary to separate from a case where although an abnormality unexpectedly occurs only in a short time, the condition immediately returns to normal as in the case of an actual thermal power station or an actual plant. In FIG. 19A, spontaneous combustion frequently occurs at an increasing tempo, with respect to any of coal types A to H.

Figure 20:
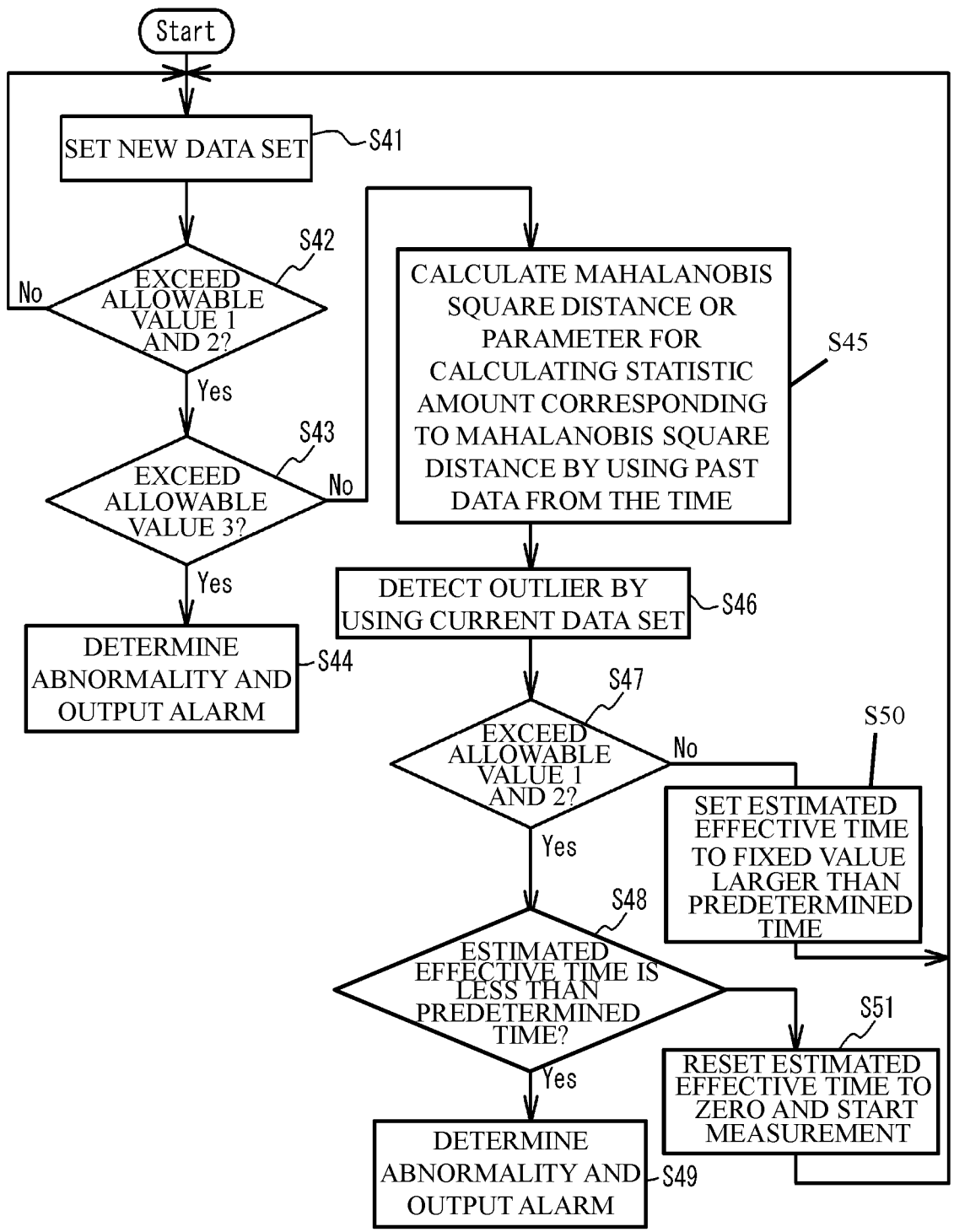
FIG. 20 illustrates an example of a flowchart that is executed when an abnormality determination is performed.

And so, FIG. 20 illustrates one embodiment of one method. The structure is the same as that of the second embodiment. The abnormality determiner 33 collects a data set after the allowable values 1 and 2 and the threshold of the estimated effective time are set by the threshold setter 32 (Step S41). The data set is collected per detection values of each position of the temperature sensor 20.

Next, the abnormality determiner 33 determines whether Mahalanobis square distances at any one of the positions exceeds the allowable value 1 and the accumulated value of the Mahalanobis square distance of the position exceeds the allowable value 2 (Step S42). When it is determined as "No" in Step S42, Step S41 is executed again. When it is determined as "Yes" in Step S42, the abnormality determiner 33 determines whether the Mahalanobis square distance exceeds the allowable value 3 (Step S43).

When it is determined as "Yes" in Step S43, the outputter 34 outputs a signal associated with the abnormality (Step S44). When it is determined as "No" in Step S43, the abnormality determiner 33 re-calculates the Mahalanobis square distance or a parameter for calculating the statistic amount corresponding to the Mahalanobis square distance in the MSD method with use of past data from that time (for example 1 hour in the case of the measurement of the 30 seconds cycle) (Step S45). The parameter in this case includes an average value, an unbiased variance-covariance matrix and an inverse matrix of a new modeling period of each position of the temperature sensor 20.

Next, the abnormality determiner 33 starts detecting of an outlier of the following Step S47 and S48 with use of a current data set collected in Step S41 (Step S46). The abnormality determiner 33 determines whether the Mahalanobis square distance of any position exceeds the allowable value 1 and the accumulated value of the Mahalanobis square distance of the position exceeds the allowable value 2 (Step S47). When it is determined as "No" in Step S47, the abnormality determiner 33 determines whether the estimated effective time is less than a predetermined value (for example, 10 minutes in the case of the measurement of 30 seconds cycle) (Step S48). When it is determined as "Yes" in Step S48, the abnormality determiner 33 outputs a signal associated with the abnormality (Step S49).

When it is determined as "No" in Step S47, the abnormality determiner 33 sets a fixed value larger than a predetermined value, as the estimated effective time (Step S50). After that, Step S41 is executed again. When it is determined as "No" in Step S48, the abnormality determiner 33 re-sets the estimated effective time to zero (Step S51). After that, Step S41 is executed again.

Being different from FIG. 10, the example of FIG. 20 is not a case where an outlier value detection is performed with use of a data set after a modeling but a case where the outlier value detection is performed again with use of a current data set and it is determined whether the estimated effective time is reset on the basis of the outlier value detection. This is because when a new data set exceeds the allowable value 1 or the allowable value 2 at a point when a predetermined time passes without modeling, it is necessary to isolate a case where the phenomenon occurs because of an actual unexpected accident from a case where the phenomenon simply occurs because of a changing of a coal type or an output instruction. The technological thought can be applied to the first embodiment. When the data set exceeds the allowable value 1 or the allowable value 2 again after the modeling, it may be thought that the former case occurs. When the estimated effective time can be evaluated, it is possible to determine whether the condition is within an accelerating phase. When the method is used, it is preferable that the non-dimensional process is performed with use of the method described on the basis of FIG. 18 or the above-mentioned method of not dividing by a standard deviation but dividing by an average. In Step S42 and Step S47 of FIG. 20, "and" may be replaced to "or".

Third Example

Figure 21:
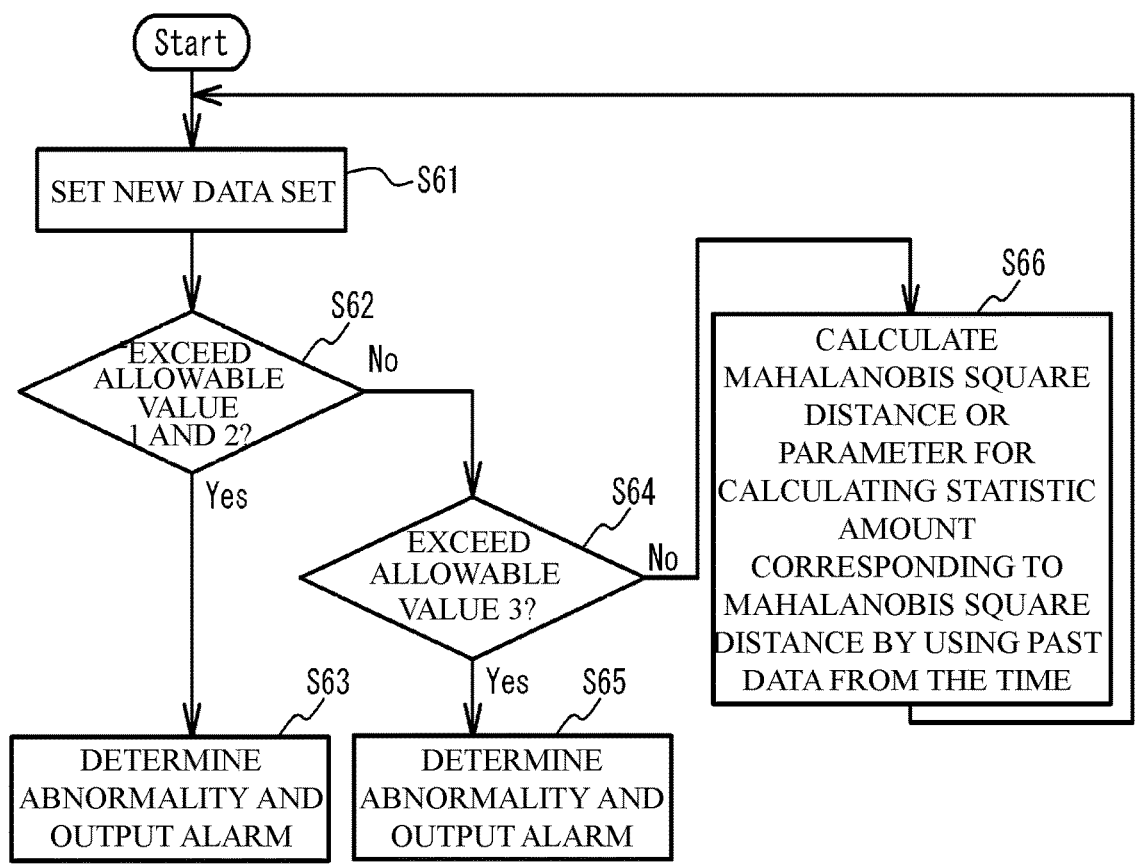
FIG. 21 illustrates a comparative embodiment.

A third embodiment illustrated in FIG. 20 is compared with a comparative embodiment of FIG. 21 regarding a standard moving window used in Japanese Patent No. 530501 and so on in which, sequentially, a modeling is certainly performed in a preliminary step of outlier detection. And, an effect of the third embodiment is clarified. In the comparative embodiment of FIG. 21, a data set is used (Step S61). When a Mahalanobis distance at any position exceeds an allowable value 1 or an accumulated value of the Mahalanobis distance exceeds an allowable value 2 (Step S62), a signal associated with an abnormality is output (Step S63). When it is determined as "No" in Step S62 and the Mahalanobis distance exceeds an allowable value 3 (Step S64), a signal associated with an abnormality is output (Step S65). When it is determined as "No" in Step S64, the Mahalanobis square distance or a parameter for calculating a statistic amount corresponding to the Mahalanobis square distance are calculated again with use of past data from the time (for example, one hour in the case of measurement at an interval of 30 seconds) (Step S66).

In any examples of FIG. 20 and FIG. 21, the non-dimensional process illustrated in FIG. 18 is performed. However, another method of not dividing by a standard deviation but dividing by an average is used. A thermal power station using a burning cycle of coal described in the first embodiment is an example. A sheet having a plurality of rolled parts illustrated in FIG. 9B, FIG. 13 and FIG. 17A to FIG. 17C is provided on a wall face as illustrated in FIG. 16A and FIG. 16B instead of the wall face temperatures 1 to 3 of FIG. 6. Measurement data at 64 positions are extracted. And the extracted measurement data are used as a data set in every measurement.

Figure 22:
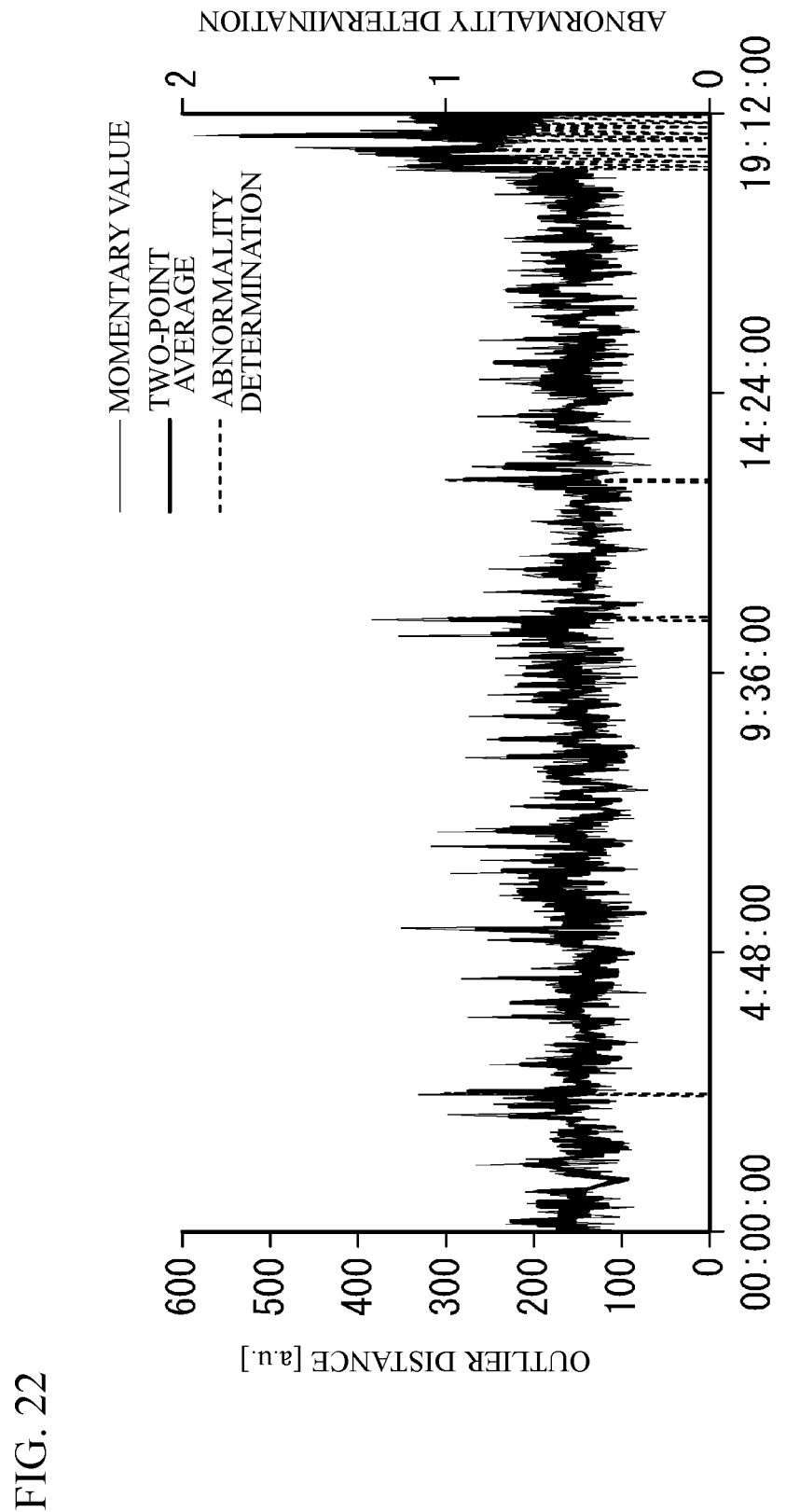
FIG. 22 illustrates results of a comparative embodiment.

FIG. 22 illustrates results. A momentary value is an outlier value distance calculates with use of a new data set. A two-point average is an average of two points that are the outlier value distance previously calculated and the outlier value currently calculated. The allowable value 1 is an average of momentary values plus $3\sigma$ (three times of a standard deviation of the momentary values) in a model updating period. The allowable value 2 is an average of two-point averages plus $3\sigma$ (three times of a standard deviation of the momentary values). The allowable value 3 is an average of momentary values plus $8\sigma$ (eight times of a standard deviation of the momentary values). In an abnormality determination, "0" is output when an abnormality does not occur in FIG. 21, and "1" is output when it is defined that the abnormality occurs. In the example of FIG. 22, the abnormality determination is frequently occurs at 18:14 that is four minutes before 18:18 at which the system stops. However, in FIG. 22, three error detections occur from 0:00. Therefore, reliability as the system is degraded.

Figure 23:
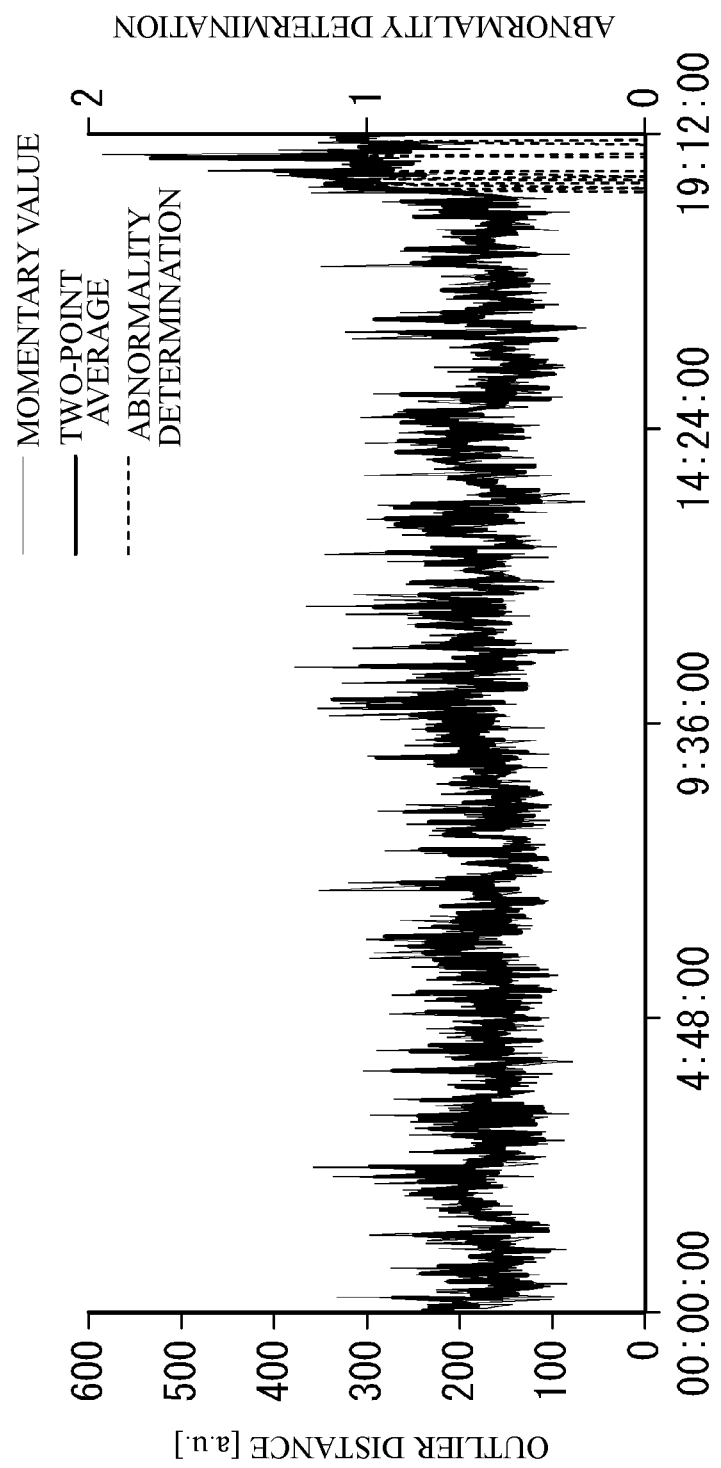
FIG. 23 illustrates results of a method of FIG. 20.

FIG. 23 illustrates results of the method illustrated in FIG. 20. Definitions, of a momentary value, a two-point average, an abnormality determination, and allowable values 1 to 3 are the same as those of FIG. 22. A threshold of an estimated effective time is four minutes. An abnormality determination frequently occurs at 18:16 that is two minutes before 18:18 at which the system stops but two minutes after the method of FIG. 21. However, an abnormality is not erroneously detected unlike FIG. 22. Therefore, reliability of the abnormality determination is maintained.

Figure 24:
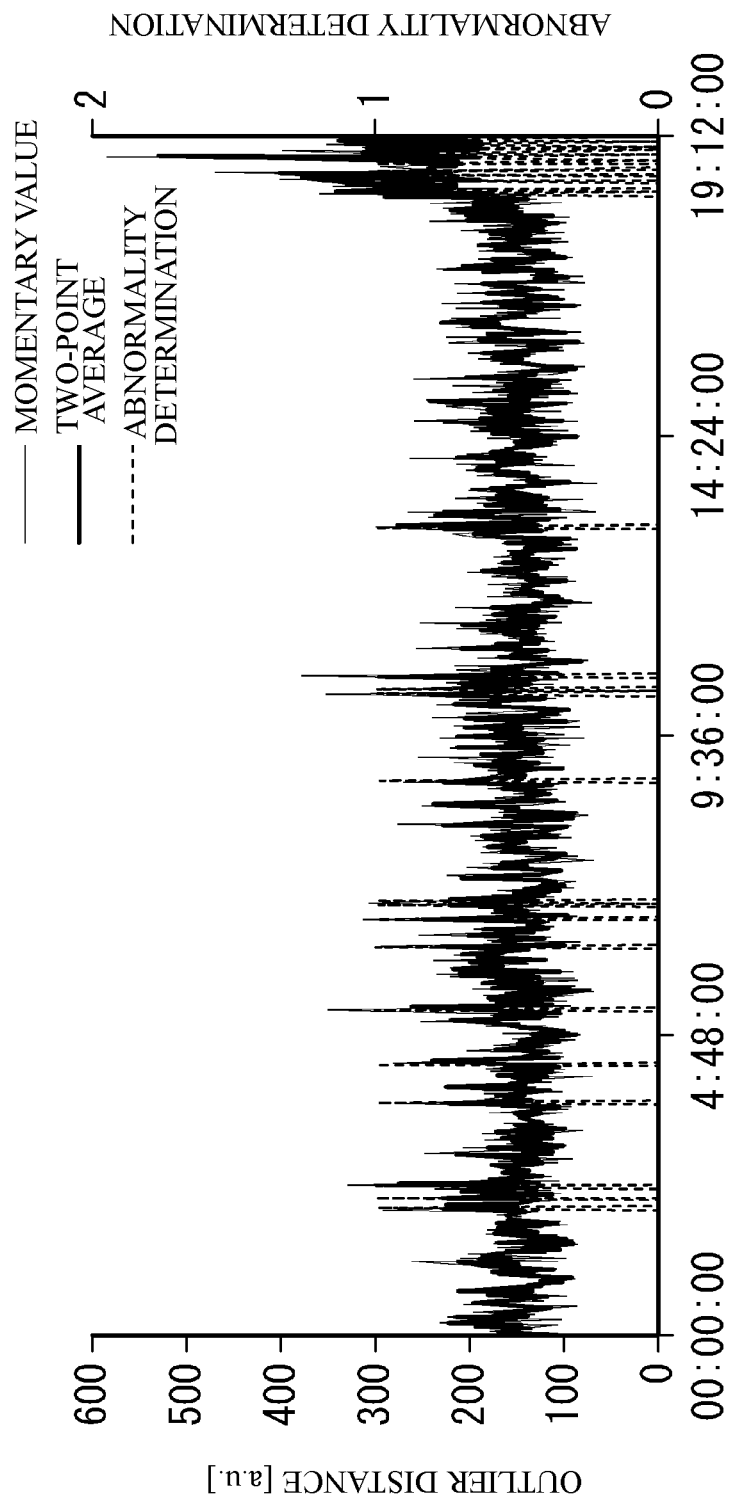
FIG. 24 illustrates results of a comparative embodiment.
Figure 25:
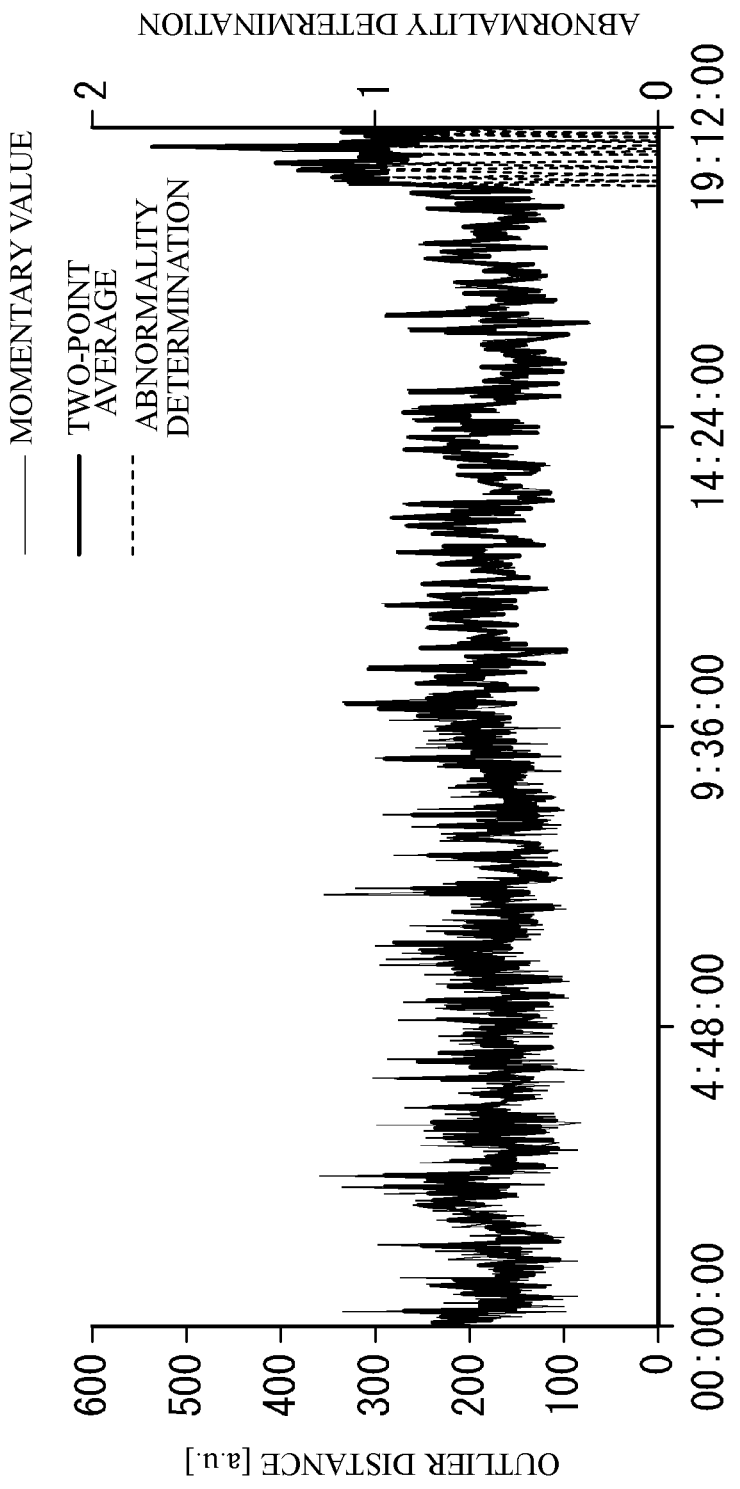
FIG. 25 illustrates results of a method of FIG. 20.

In FIG. 22 and FIG. 23, the allowable value 1 is changed to the average of the momentary value plus twice of the standard deviation of the momentary value ($2\sigma$), and the allowable value 2 is changed to the average of the two-point averages plus twice of the standard deviation of the momentary value ($2\sigma$). FIG. 24 and FIG. 25 show results of this case. In any of FIG. 24 and FIG. 25, the time when the abnormality is frequently determined is the same as that of FIG. 22 and FIG. 23. In the method of FIG. 21, erroneous detection frequently occurs further. However, in the method of FIG. 20, the error detection does not occur. Therefore, the reliability of the abnormality determination is maintained.

That is, when the embodiment different from a moving window type outlier detection of Japanese Patent No. 5308501 is used, it is possible to detect the precursory phenomenon even if ambiguous widths are set such as an average plus twice of a standard deviation ($2\sigma$) to three times of the standard deviation ($3\sigma$) is set with respect to the allowable values 1 and 2.

Fourth Example

Figure 26:
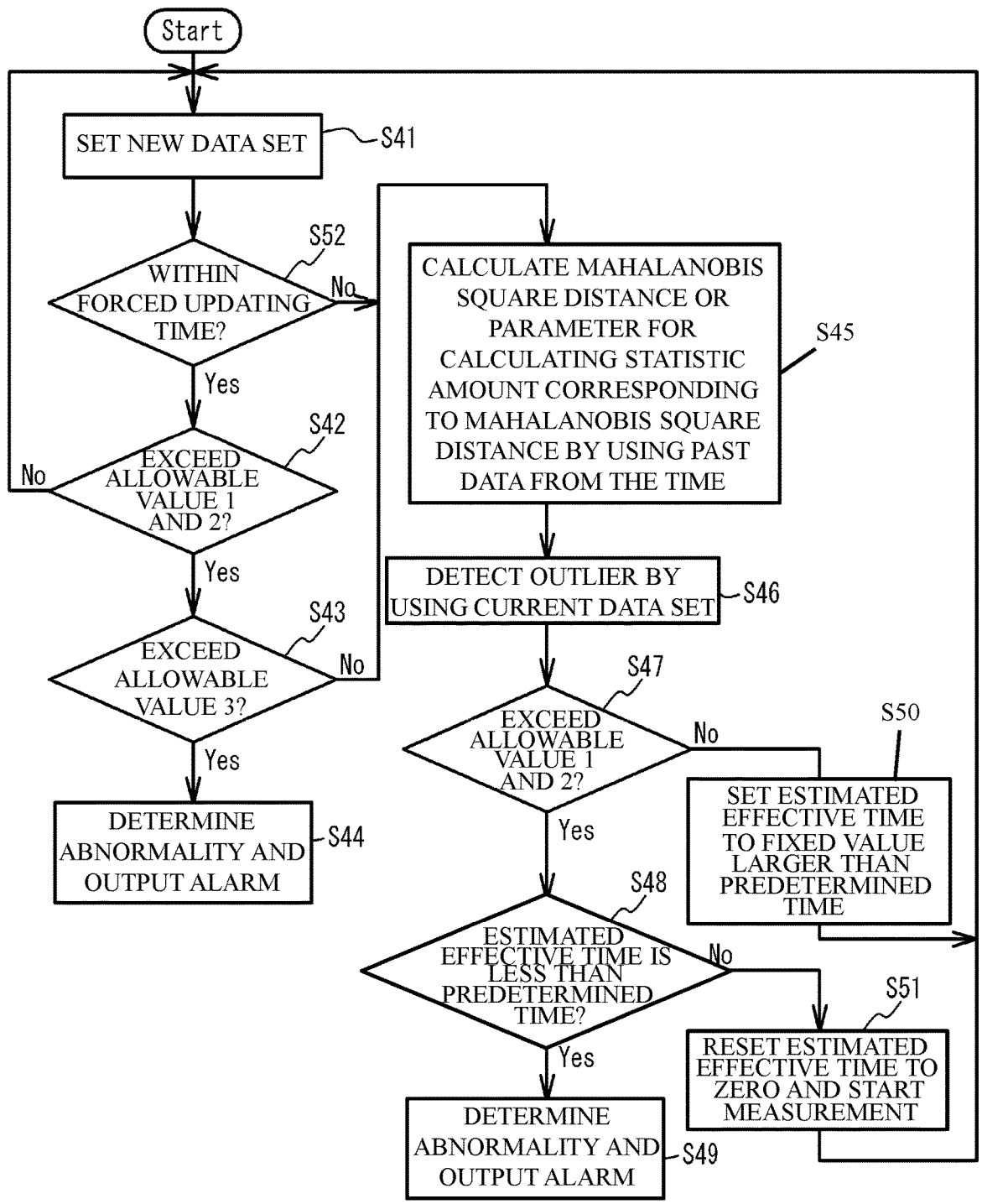
FIG. 26 illustrates an example of a flowchart that is executed when an abnormality determination is performed.

In a fourth example, the detection of the abnormality precursory phenomenon of FIG. 26 is performed with respect to various sensing data of a thermal power station using the burning cycle of coal described in the first embodiment, in addition to the temperature. In concrete, the process illustrated in FIG. 26 is performed with respect to time-series data of 16 sensing data including the target variables 1 to 3 and the explanatory variables of a coal fired power station illustrated in FIG. 6. First, a non-dimensional process is performed with use of the method described on the basis of FIG. 18. However, a method of division by a standard deviation is not performed, but a method of division by an average is performed as well as the third example.

The process of FIG. 26 is different from the process of FIG. 20 in a point that the modeling is forcibly performed again in a sequential process when a predetermined long time passes. In concrete, after execution of Step S41 and before execution of Step S42, the abnormality determiner 33 determines whether a current time is within a forced updating time (Step S52). When it is determined as "Yes" in Step S52, Step S42 is executed. When it is determined as "No" in Step S52, Step S45 is executed. Step S52 is performed, because data contributing to an outlier apparently changes when a predetermined time passes even if the data as the outlier is transferred within a no-problem range and it is preferable that the apparent changing is corrected. The time is referred to as a forced updating time. The forced updating time is set to a time that is few times longer than the estimated effective time.

In the fourth example, the allowable value 1 is an average of momentary values plus $3\sigma$ (three times of a standard deviation of the momentary values) in a model updating period, as well as the third example. The allowable value 2 is an average of two-point averages plus $3\sigma$ (three times of a standard deviation of the momentary values). The allowable value 3 is an average of momentary values plus $8\sigma$ (eight times of a standard deviation of the momentary values). The estimated effective time is five minutes. The forced updating time is 40 minutes. The sensing data is collected every two minutes.

Figure 27:
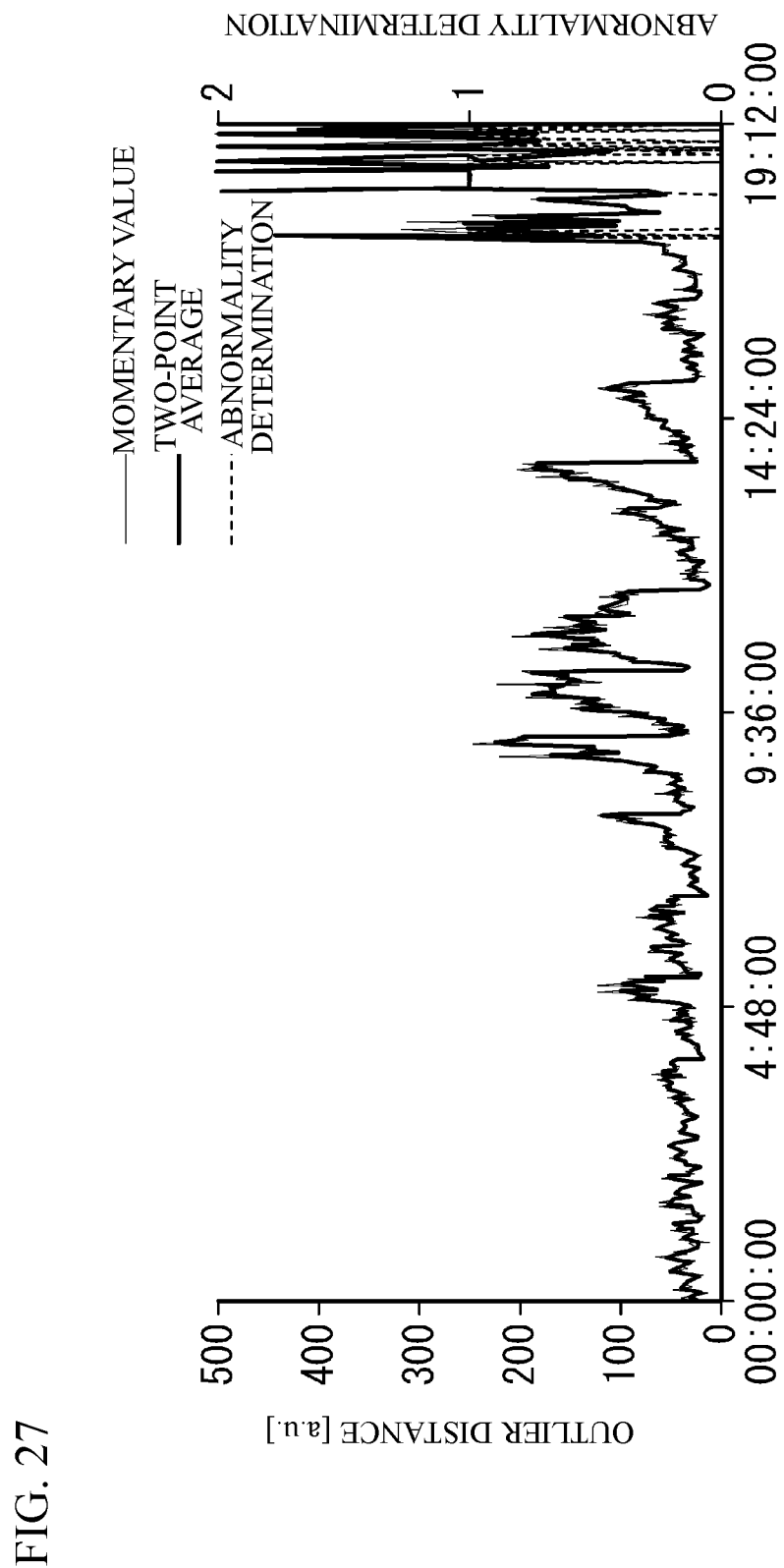
FIG. 27 illustrates results of an abnormality determination.
Figure 28:
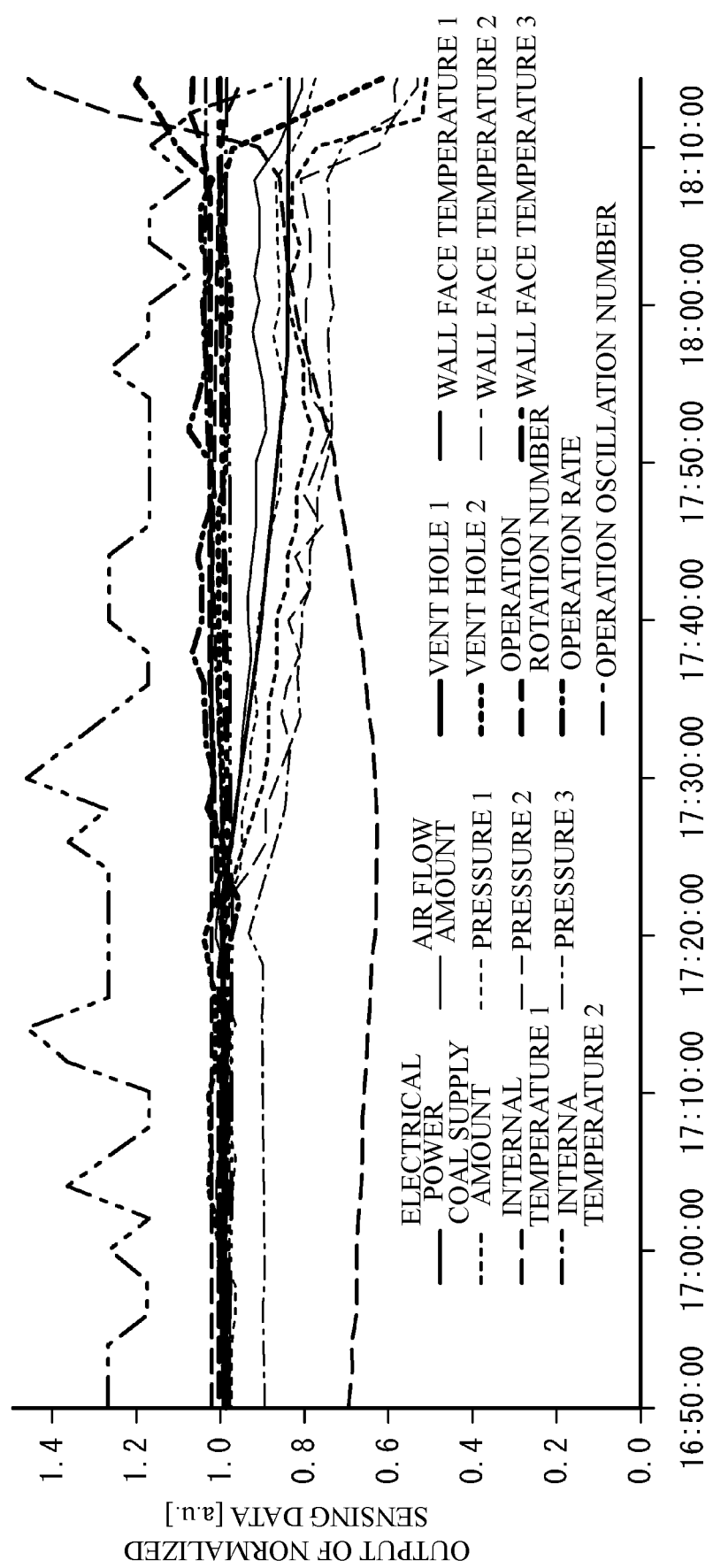
FIG. 28 illustrates normalized values of sensing data.

FIG. 27 illustrates results. In FIG. 27, it is determined that an abnormality occurs at 17:24 that is earlier than 18:18 at which the system stops by approximately 1 hour. After that, the condition returns to normal, and an abnormality often occurs again at 18:10. And so, FIG. 28 illustrates sensing data that are normalized by an average from 0:00 to 2:00 of a day. The sensing data are normalized by a fixed value in order to compare the sensing data with an identical index because modeling id not performed.

As illustrated in FIG. 28, the coal supply amount decreases from 17:22. After that, a plurality of sensing data start a different transition. The current estimated effective time is 5 minutes. Therefore, it may be decided that an abnormality occurs after 17:27 with high probability. However, it is determined that an abnormality occurs at 17:24 that is a next measured point after the coal supply amount decreases. This is because although a few data including the coal supply amount further decreases, the other data do not apparently change and exceeds the average plus 8σ (eight times of a standard deviation of momentary values). It is determined that an abnormality occurs because the decreasing of the coal supply amount is suppressed, many parameters including the coal amount supply start to steeply change and exceeds the average plus 8σ (eight times of a standard deviation of momentary values).

With the precursory phenomenon detection of the embodiments, it is possible to precisely detect an abnormality precursory phenomenon with a quick response even if a threshold including ambiguity is set from a correlation among sensing data having a various dimension in addition to a temperature. In Step S42 and Step S47 of FIG. 26, "and" may be replaced to "or".

Preferred embodiments of the present invention have been described in detail. The present invention is not limited to the specific embodiments but may be varied or changed within the scope of the claimed invention. For example, a single threshold is set with respect to the estimated effective time. However, a second threshold larger than a first threshold may be set. In this case, when the estimated effective time is longer than the first threshold and shorter than the second threshold, a caution information alarm may be output as calling an attention of which safety level is higher than an abnormality alarm by one stage.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A determination device comprising:
a memory; and
a processor coupled to the memory and the processor configured to execute a process, the process comprising:
generating a reference model of a sensor detection value,
after generating the reference model, starting a measuring of a time duration at a predetermined point in time before detecting a deviation between the reference model and the sensor detection value exceeds a threshold and continuing the measuring of the time duration until the deviation between the reference model and the sensor detection value exceeds the threshold,
determining whether the time duration measured in the measuring is shorter than a predetermined time duration; and
outputting a signal associated with an abnormality when the time duration is determined to be shorter than the predetermined time duration.

2. The determination device as claimed in claim 1, wherein in the generating, the reference model is generated with use of the sensor detection value and detection values of a plurality of other sensors having a correlation with the sensor detection value.

3. The determination device as claimed in claim 2, wherein in the generating, the reference model is generated by a regression analysis with use of the sensor detection value and the detection values of the plurality of other sensors.

4. The determination device as claimed in claim 2, wherein the process further comprises re-generating the reference model with use of the sensor detection value and the detection values of the plurality of other sensors of a predetermined past time from a time when a deviation between the reference model and the sensor detection value exceeds a threshold.

5. The determination device as claimed in claim 4, wherein in the determining, further determining whether a time from a predetermined time until a deviation between the sensor detection value and the reference model that is re-generated exceeds the threshold is shorter than a predetermined time, with use of the sensor detection value before re-generating of the reference model.

6. The determination device as claimed in claim in claim 2, wherein the deviation between the reference model and the sensor detection value is a difference between the reference model and the sensor detection value.

7. The determination device as claimed in claim 1, wherein:
in the generating, the reference model of the detection value is generated with use of a correlation between the detection values of a plurality of sensors; and
in the determining, further determining whether a time until the deviation between the reference model and any one of the detection values of the plurality of sensors exceeds a threshold is shorter than a predetermined time.

8. The determination device as claimed in claim 7, wherein in the generating, the reference model is generated with use of a center of variability on which a correlation degree of the detection values of the plurality of sensors influences.

9. The determination device as claimed in claim 7, wherein the process further comprises re-generating the reference model with use of the detection values of the plurality of sensors of a predetermined past period from a time when the deviation exceeds the threshold.

10. The determination device as claimed in claim 7, wherein the detection values of the plurality of sensors are results obtained from a back scattering lights at different longitudinal direction positions in a single optical fiber.

11. The determination device as claimed in claim 7, wherein in the generating, the reference model is generated with use of a variance-covariance matrix using an average of detection values of the plurality of sensors.

12. The determination device as claimed in claim 1, wherein the threshold of the deviation is determined on a basis of the deviation of a predetermined period after generating of the reference model.

13. The determination device as claimed in claim 1, wherein the predetermined time is determined on a basis of a variability of a time until the deviation exceeds the threshold.

14. The determination device as claimed in claim 1, wherein the predetermined point in time is a starting point of measuring the deviation between the reference model and the sensor detection value.

15. The determination device as claimed in claim 1, wherein, the determining includes whether the deviation exceeds a first threshold, whether an accumulated value of the deviation exceeds a second threshold, and whether one of a first time duration from the predetermined point in time until the deviation exceeds the first threshold and a second time duration from the predetermined point in time until the accumulated value exceeds the second threshold is shorter than the predetermined time duration, and wherein, in the outputting, the signal is output upon determining that the deviation exceeds the first threshold or the accumulated value exceeds the second threshold, and upon determining that one of the first time duration and the second time duration is shorter than the predetermined time duration.

16. A determination method comprising:

generating a reference model of a sensor detection value;
after generating the reference model, starting a measuring of a time duration at a predetermined point in time before detecting a deviation between the reference model and the sensor detection value exceeds a threshold and continuing the measuring of the time duration until the deviation between the reference model and the sensor detection value exceeds the threshold;
determining the time duration measured in the measuring is shorter than a predetermined time duration; and
outputting a signal associated with an abnormality when the time duration is determined to be shorter than the predetermined time duration.

17. The determination method as claimed in claim 16, wherein in the generating, the reference model is generated with use of the sensor detection value and detection values of a plurality of other sensors having a correlation with the sensor detection value.

18. The determination method as claimed in claim 17, wherein in the generating, the reference model is generated by a regression analysis with use of the sensor detection value and the detection values of the plurality of other sensors.

19. The determination method as claimed in claim 17, further comprising re-generating the reference model with use of the sensor detection value and the detection values of the plurality of other sensors of a predetermined past time from a time when a deviation between the reference model and the sensor detection value exceeds a threshold.

20. The determination method as claimed in claim in claim 17, wherein the deviation between the reference model and the sensor detection value is a difference between the reference model and the sensor detection value.

21. The determination method as claimed in claim 16, wherein:
in the generating, the reference model of the detection value is generated with use of a correlation between the detection values of a plurality of sensors; and
in the determining, further determining whether a time until the deviation between the reference model and any one of the detection values of the plurality of sensors exceeds a threshold is shorter than a predetermined time.

22. A computer readable, non-transitory medium storing a program that causes a computer to execute a process, the process comprising:

generating a reference model of a sensor detection value;
after generating the reference model, starting a measuring a time duration at a predetermined point in time before detecting a deviation between the reference model and the sensor detection value exceeds a threshold and continuing the measuring of the time duration until the deviation between the reference model and the sensor detection value exceeds the threshold;
determining whether the time duration measured in the measuring is shorter than a predetermined time duration; and
outputting a signal associated with an abnormality when the time duration is determined to be shorter than the predetermined time duration.

* * * * *